United States Patent
Reynolds

(10) Patent No.: US 9,288,521 B2
(45) Date of Patent: Mar. 15, 2016

(54) SYSTEMS AND METHODS FOR UPDATING MEDIA ASSET DATA BASED ON PAUSE POINT IN THE MEDIA ASSET

(71) Applicant: Rovi Guides, Inc., Santa Clara, CA (US)

(72) Inventor: Laurie Reynolds, San Jose, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 7 days.

(21) Appl. No.: 14/288,743

(22) Filed: May 28, 2014

(65) Prior Publication Data

US 2015/0350707 A1    Dec. 3, 2015

(51) Int. Cl.
| | |
|---|---|
| H04N 5/445 | (2011.01) |
| H04N 21/2668 | (2011.01) |
| H04N 21/25 | (2011.01) |
| H04N 21/45 | (2011.01) |
| H04N 21/466 | (2011.01) |
| H04N 21/2387 | (2011.01) |
| H04N 21/433 | (2011.01) |
| H04N 21/472 | (2011.01) |
| H04N 21/6587 | (2011.01) |
| H04N 21/81 | (2011.01) |

(52) U.S. Cl.
CPC ....... *H04N 21/2668* (2013.01); *H04N 21/2387* (2013.01); *H04N 21/252* (2013.01); *H04N 21/4333* (2013.01); *H04N 21/4532* (2013.01); *H04N 21/4668* (2013.01); *H04N 21/47202* (2013.01); *H04N 21/6587* (2013.01); *H04N 21/812* (2013.01)

(58) Field of Classification Search
CPC .................................................. H04N 21/4333
USPC ........................................................... 725/46
See application file for complete search history.

(56) References Cited

U.S. PATENT DOCUMENTS

| | | | |
|---|---|---|---|
| 3,729,581 A | 4/1973 | Anderson | |
| 4,024,401 A | 5/1977 | Bernstein et al. | |
| 4,058,830 A | 11/1977 | Guinet et al. | |

(Continued)

FOREIGN PATENT DOCUMENTS

| | | |
|---|---|---|
| CA | 2345161 | 6/1994 |
| CN | 1129879 A | 8/1996 |

(Continued)

OTHER PUBLICATIONS

"A Financial Times Survey: Viewdata (Advertisement)," Financial Times, Mar. 20, 1979.

(Continued)

*Primary Examiner* — Nasser Goodarzi
*Assistant Examiner* — Michael Hong
(74) *Attorney, Agent, or Firm* — Ropes & Gray LLP

(57) ABSTRACT

Systems and methods for associating data with a media asset are provided. A plurality of messages from a plurality of users is received at a remote server. Each message identifies a play position within the media asset at which the respective one of the users paused the media asset. A reference play position is selected based on the play position identified by one of the plurality of messages. A number representing how many of the messages identify a play position that corresponds to the reference play position is computed. In response to determining that the number exceeds a threshold, a frame of the media asset that corresponds to the reference play position is selected. Data associated with the media asset is updated based on the selected frame.

20 Claims, 6 Drawing Sheets

(56) References Cited

U.S. PATENT DOCUMENTS

| | | |
|---|---|---|
| 4,081,753 A | 3/1978 | Miller |
| 4,170,782 A | 10/1979 | Miller |
| 4,203,130 A | 5/1980 | Doumit et al. |
| 4,271,532 A | 6/1981 | Wine |
| 4,280,148 A | 7/1981 | Saxena |
| 4,300,040 A | 11/1981 | Gould et al. |
| 4,367,559 A | 1/1983 | Tults |
| 4,375,651 A | 3/1983 | Templin et al. |
| 4,381,522 A | 4/1983 | Lambert |
| 4,390,901 A | 6/1983 | Keiser |
| 4,425,579 A | 1/1984 | Merrell |
| 4,429,385 A | 1/1984 | Cichelli et al. |
| 4,488,179 A | 12/1984 | Kruger et al. |
| 4,495,654 A | 1/1985 | Deiss |
| 4,527,194 A | 7/1985 | Sirazi |
| 4,573,072 A | 2/1986 | Freeman |
| 4,602,279 A | 7/1986 | Freeman |
| 4,625,080 A | 11/1986 | Scott |
| 4,641,205 A | 2/1987 | Beyers, Jr. |
| 4,645,873 A | 2/1987 | Chomet |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,704,725 A | 11/1987 | Harvey et al. |
| 4,706,121 A | 11/1987 | Young |
| 4,714,919 A | 12/1987 | Foster |
| 4,751,578 A | 6/1988 | Reiter et al. |
| 4,754,326 A | 6/1988 | Kram et al. |
| 4,761,684 A | 8/1988 | Clark et al. |
| 4,787,063 A | 11/1988 | Muguet |
| 4,833,710 A | 5/1989 | Hirashima |
| 4,847,698 A | 7/1989 | Freeman |
| 4,847,699 A | 7/1989 | Freeman |
| 4,847,700 A | 7/1989 | Freeman |
| 4,882,732 A | 11/1989 | Kaminaga |
| 4,899,139 A | 2/1990 | Ishimochi et al. |
| 4,908,707 A | 3/1990 | Kinghorn |
| 4,908,713 A | 3/1990 | Levine |
| 4,942,391 A | 7/1990 | Kikuta |
| 4,959,719 A | 9/1990 | Strubbe et al. |
| 4,963,994 A | 10/1990 | Levine |
| 4,965,825 A | 10/1990 | Harvey et al. |
| 4,977,455 A | 12/1990 | Young |
| 5,003,384 A | 3/1991 | Durden et al. |
| 5,016,273 A | 5/1991 | Hoff |
| 5,027,400 A | 6/1991 | Baji et al. |
| 5,036,314 A | 7/1991 | Barillari et al. |
| 5,038,211 A | 8/1991 | Hallenbeck |
| 5,047,867 A | 9/1991 | Strubbe et al. |
| 5,075,771 A | 12/1991 | Hashimoto |
| 5,089,885 A | 2/1992 | Clark |
| 5,090,049 A | 2/1992 | Chen |
| 5,093,718 A | 3/1992 | Hoarty et al. |
| 5,109,414 A | 4/1992 | Harvey et al. |
| 5,113,259 A | 5/1992 | Romesburg et al. |
| 5,126,851 A | 6/1992 | Yoshimura et al. |
| 5,132,992 A | 7/1992 | Yurt et al. |
| 5,151,782 A | 9/1992 | Ferraro |
| 5,151,789 A | 9/1992 | Young |
| 5,155,591 A | 10/1992 | Wachob |
| 5,170,388 A | 12/1992 | Endoh |
| 5,172,413 A | 12/1992 | Bradley et al. |
| 5,179,439 A | 1/1993 | Hashimoto |
| 5,187,589 A | 2/1993 | Kono et al. |
| 5,189,630 A | 2/1993 | Barstow et al. |
| 5,191,423 A | 3/1993 | Yoshida |
| 5,195,134 A | 3/1993 | Inoue |
| 5,210,611 A | 5/1993 | Yee et al. |
| 5,220,420 A | 6/1993 | Hoarty et al. |
| 5,223,924 A | 6/1993 | Strubbe |
| 5,231,494 A | 7/1993 | Wachob |
| 5,231,664 A | 7/1993 | Bestler et al. |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,241,428 A | 8/1993 | Goldwasser et al. |
| 5,253,066 A | 10/1993 | Vogel |
| 5,262,860 A | 11/1993 | Fizpatrick et al. |
| 5,283,819 A | 2/1994 | Glick et al. |
| 5,285,278 A | 2/1994 | Holman |
| 5,296,931 A | 3/1994 | Na |
| 5,311,423 A | 5/1994 | Clark |
| 5,317,403 A | 5/1994 | Keenan |
| 5,323,240 A | 6/1994 | Amano et al. |
| 5,325,423 A | 6/1994 | Lewis |
| 5,335,277 A | 8/1994 | Harvey et al. |
| 5,347,632 A | 9/1994 | Filepp et al. |
| 5,353,121 A | 10/1994 | Young et al. |
| 5,357,276 A | 10/1994 | Banker et al. |
| 5,359,367 A | 10/1994 | Stockill |
| 5,371,551 A | 12/1994 | Logan et al. |
| 5,382,983 A | 1/1995 | Kwoh et al. |
| 5,396,546 A | 3/1995 | Remillard |
| 5,398,138 A | 3/1995 | Tomita |
| 5,404,393 A | 4/1995 | Remillard |
| 5,410,326 A | 4/1995 | Goldstein |
| 5,410,344 A | 4/1995 | Graves et al. |
| 5,410,367 A | 4/1995 | Zahavi et al. |
| 5,412,720 A | 5/1995 | Hoarty |
| 5,414,756 A | 5/1995 | Levine |
| 5,432,561 A | 7/1995 | Strubbe |
| 5,438,423 A | 8/1995 | Lynch et al. |
| 5,442,389 A | 8/1995 | Blahut et al. |
| 5,444,499 A | 8/1995 | Saitoh |
| 5,446,488 A | 8/1995 | Vogel |
| 5,446,919 A | 8/1995 | Wilkins |
| 5,455,570 A | 10/1995 | Cook et al. |
| 5,465,113 A | 11/1995 | Gilboy |
| 5,465,385 A | 11/1995 | Ohga et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,481,296 A | 1/1996 | Cragun et al. |
| 5,483,278 A | 1/1996 | Strubbe et al. |
| 5,485,197 A | 1/1996 | Hoarty |
| 5,488,409 A | 1/1996 | Yuen et al. |
| 5,502,504 A | 3/1996 | Marshall et al. |
| 5,515,106 A | 5/1996 | Chaney et al. |
| 5,515,511 A | 5/1996 | Nguyen et al. |
| 5,517,254 A | 5/1996 | Monta et al. |
| 5,517,256 A | 5/1996 | Hashimoto |
| 5,523,796 A | 6/1996 | Marshall et al. |
| 5,524,195 A | 6/1996 | Clanton, III et al. |
| 5,526,034 A | 6/1996 | Hoarty et al. |
| 5,526,035 A | 6/1996 | Lappington et al. |
| 5,528,304 A | 6/1996 | Cherrick et al. |
| 5,534,911 A | 7/1996 | Levitan |
| 5,537,141 A | 7/1996 | Harper et al. |
| 5,548,340 A | 8/1996 | Bertram |
| 5,550,576 A | 8/1996 | Klosterman |
| 5,550,863 A | 8/1996 | Yurt et al. |
| 5,553,221 A | 9/1996 | Reimer et al. |
| 5,559,547 A | 9/1996 | Hagar |
| 5,559,548 A | 9/1996 | Davis et al. |
| 5,559,549 A | 9/1996 | Hendricks et al. |
| 5,559,550 A | 9/1996 | Mankovitz |
| 5,561,709 A | 10/1996 | Remillard |
| 5,563,665 A | 10/1996 | Chang |
| 5,570,295 A | 10/1996 | Isenberg et al. |
| 5,572,442 A | 11/1996 | Schulhof et al. |
| 5,572,643 A | 11/1996 | Judson |
| 5,576,755 A | 11/1996 | Davis et al. |
| 5,579,239 A | 11/1996 | Freeman et al. |
| 5,583,560 A | 12/1996 | Florin et al. |
| 5,583,561 A | 12/1996 | Baker et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |

(56) References Cited

U.S. PATENT DOCUMENTS

| | | |
|---|---|---|
| 5,594,490 A | 1/1997 | Dawson et al. |
| 5,594,509 A | 1/1997 | Florin et al. |
| 5,594,661 A | 1/1997 | Bruner et al. |
| 5,596,373 A | 1/1997 | White et al. |
| 5,600,364 A | 2/1997 | Hendricks et al. |
| 5,600,573 A | 2/1997 | Hendricks et al. |
| 5,606,374 A | 2/1997 | Bertram |
| 5,610,653 A | 3/1997 | Abecassis |
| 5,616,876 A | 4/1997 | Cluts |
| 5,617,526 A | 4/1997 | Oran et al. |
| 5,617,565 A | 4/1997 | Augenbraum et al. |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,625,693 A | 4/1997 | Rohatgi et al. |
| 5,629,732 A | 5/1997 | Moskowitz et al. |
| 5,629,733 A | 5/1997 | Youman et al. |
| 5,630,119 A | 5/1997 | Aristides et al. |
| 5,631,995 A | 5/1997 | Weissensteiner et al. |
| 5,632,007 A | 5/1997 | Freeman |
| 5,635,978 A | 6/1997 | Alten et al. |
| 5,635,979 A | 6/1997 | Kostreski et al. |
| 5,635,989 A | 6/1997 | Rothmuller |
| 5,640,484 A | 6/1997 | Mankovitz |
| 5,648,824 A | 7/1997 | Dunn et al. |
| 5,654,748 A | 8/1997 | Matthews, III |
| 5,657,072 A | 8/1997 | Aristides et al. |
| 5,659,350 A | 8/1997 | Hendricks et al. |
| 5,659,742 A | 8/1997 | Beattie et al. |
| 5,663,757 A | 9/1997 | Morales |
| 5,666,293 A | 9/1997 | Metz et al. |
| 5,666,645 A | 9/1997 | Thomas et al. |
| 5,671,411 A | 9/1997 | Watts et al. |
| 5,675,390 A | 10/1997 | Schindler et al. |
| 5,677,708 A | 10/1997 | Matthews, III et al. |
| 5,677,981 A | 10/1997 | Kato et al. |
| 5,682,195 A | 10/1997 | Hendricks et al. |
| 5,682,196 A | 10/1997 | Freeman |
| 5,682,206 A | 10/1997 | Wehmeyer et al. |
| 5,682,525 A | 10/1997 | Bouve et al. |
| 5,684,525 A | 11/1997 | Klosterman |
| 5,686,954 A | 11/1997 | Yoshinobu et al. |
| 5,691,476 A | 11/1997 | Madaras |
| 5,692,214 A | 11/1997 | Levine |
| 5,694,163 A | 12/1997 | Harrison |
| 5,694,176 A | 12/1997 | Bruette et al. |
| 5,696,905 A | 12/1997 | Reimer et al. |
| 5,699,052 A | 12/1997 | Miyahara |
| 5,699,107 A | 12/1997 | Lawler et al. |
| 5,701,161 A | 12/1997 | Williams et al. |
| 5,701,383 A | 12/1997 | Russo et al. |
| 5,708,767 A | 1/1998 | Yeo et al. |
| 5,710,601 A | 1/1998 | Marshall et al. |
| 5,710,884 A | 1/1998 | Dedrick |
| 5,717,923 A | 2/1998 | Dedrick |
| 5,721,827 A | 2/1998 | Logan et al. |
| 5,721,829 A | 2/1998 | Dunn et al. |
| 5,722,041 A | 2/1998 | Freadman |
| 5,724,091 A | 3/1998 | Freeman et al. |
| 5,724,103 A | 3/1998 | Batchelor |
| 5,724,567 A | 3/1998 | Rose et al. |
| 5,729,280 A | 3/1998 | Inoue et al. |
| 5,731,844 A | 3/1998 | Rauch et al. |
| 5,734,853 A | 3/1998 | Hendricks et al. |
| 5,734,893 A | 3/1998 | Li et al. |
| 5,742,816 A | 4/1998 | Barr et al. |
| 5,745,710 A | 4/1998 | Clanton, III et al. |
| 5,748,191 A | 5/1998 | Rozak et al. |
| 5,748,716 A | 5/1998 | Levine |
| 5,749,081 A | 5/1998 | Whiteis |
| 5,751,282 A | 5/1998 | Girard et al. |
| 5,752,160 A | 5/1998 | Dunn |
| 5,754,939 A | 5/1998 | Herz et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,606 A | 6/1998 | Wolzien |
| 5,768,528 A | 6/1998 | Stumm |
| 5,774,186 A | 6/1998 | Brodsky et al. |
| 5,774,357 A | 6/1998 | Hoffberg et al. |
| 5,774,664 A | 6/1998 | Hidary et al. |
| 5,774,666 A | 6/1998 | Portuesi |
| 5,778,181 A | 7/1998 | Hidary et al. |
| 5,781,228 A | 7/1998 | Sposato |
| 5,781,246 A | 7/1998 | Alten et al. |
| 5,781,734 A | 7/1998 | Ohno et al. |
| 5,787,259 A | 7/1998 | Haroun et al. |
| 5,788,507 A | 8/1998 | Redford et al. |
| 5,790,201 A | 8/1998 | Antos |
| 5,790,202 A | 8/1998 | Kummer et al. |
| 5,790,753 A | 8/1998 | Krishmanoorthy et al. |
| 5,793,964 A | 8/1998 | Rogers et al. |
| 5,793,972 A | 8/1998 | Shane |
| 5,798,785 A | 8/1998 | Hendricks et al. |
| 5,801,747 A | 9/1998 | Bedard |
| 5,805,154 A | 9/1998 | Brown |
| 5,805,763 A | 9/1998 | Lawler et al. |
| 5,805,806 A | 9/1998 | McArthur |
| 5,809,214 A | 9/1998 | Nureki et al. |
| 5,809,471 A | 9/1998 | Brodsky |
| 5,812,123 A | 9/1998 | Rowe et al. |
| 5,812,124 A | 9/1998 | Eick et al. |
| 5,812,931 A | 9/1998 | Yuen |
| 5,815,145 A | 9/1998 | Matthews, III |
| 5,818,441 A | 10/1998 | Throckmorton et al. |
| 5,818,511 A | 10/1998 | Farry et al. |
| 5,818,935 A | 10/1998 | Maa |
| 5,819,156 A | 10/1998 | Belmont |
| 5,822,123 A | 10/1998 | Davis et al. |
| 5,826,168 A | 10/1998 | Inoue et al. |
| 5,828,370 A | 10/1998 | Moeller et al. |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| 5,830,068 A | 11/1998 | Brenner et al. |
| 5,832,223 A | 11/1998 | Hara et al. |
| 5,833,468 A | 11/1998 | Guy et al. |
| 5,835,717 A | 11/1998 | Karlton et al. |
| 5,838,314 A | 11/1998 | Neel et al. |
| 5,838,383 A | 11/1998 | Chimoto et al. |
| 5,844,552 A | 12/1998 | Gaughan et al. |
| 5,844,620 A | 12/1998 | Coleman et al. |
| 5,847,750 A | 12/1998 | Srivastava et al. |
| 5,848,396 A | 12/1998 | Gerace |
| 5,850,218 A | 12/1998 | LaJoie et al. |
| 5,852,437 A | 12/1998 | Wugofski et al. |
| 5,861,881 A | 1/1999 | Freeman et al. |
| 5,861,906 A | 1/1999 | Dunn et al. |
| 5,862,292 A | 1/1999 | Kubota et al. |
| 5,867,226 A | 2/1999 | Wehmeyer et al. |
| 5,867,233 A | 2/1999 | Tanaka |
| 5,870,754 A | 2/1999 | Dimitrova et al. |
| 5,873,660 A | 2/1999 | Walsh et al. |
| 5,875,108 A | 2/1999 | Hoffberg et al. |
| 5,877,906 A | 3/1999 | Nagasawa et al. |
| 5,880,720 A | 3/1999 | Iwafune et al. |
| 5,880,768 A | 3/1999 | Lemmons et al. |
| 5,884,141 A | 3/1999 | Inoue et al. |
| 5,886,732 A | 3/1999 | Humpleman |
| 5,887,243 A | 3/1999 | Harvey et al. |
| 5,889,950 A | 3/1999 | Kuzma |
| 5,892,498 A | 4/1999 | Marshall et al. |
| 5,892,767 A | 4/1999 | Bell et al. |
| 5,903,545 A | 5/1999 | Sabourin et al. |
| 5,903,816 A | 5/1999 | Broadwin et al. |
| 5,907,322 A | 5/1999 | Kelly et al. |
| 5,907,323 A | 5/1999 | Lawler et al. |
| 5,914,712 A | 6/1999 | Sartain et al. |
| 5,914,746 A | 6/1999 | Matthews, III et al. |
| 5,915,026 A | 6/1999 | Mankovitz |
| 5,915,250 A | 6/1999 | Jain et al. |

(56) References Cited

U.S. PATENT DOCUMENTS

| | | |
|---|---|---|
| 5,923,848 A | 7/1999 | Goodhand et al. |
| 5,929,849 A | 7/1999 | Kikinis |
| 5,929,932 A | 7/1999 | Otsuki et al. |
| 5,931,905 A | 8/1999 | Hashimoto et al. |
| 5,937,160 A | 8/1999 | Davis et al. |
| 5,940,073 A | 8/1999 | Klosterman et al. |
| 5,945,987 A | 8/1999 | Dunn |
| 5,946,386 A | 8/1999 | Rogers et al. |
| 5,949,954 A | 9/1999 | Young et al. |
| 5,955,988 A | 9/1999 | Blonstein et al. |
| 5,956,026 A | 9/1999 | Ratakonda |
| 5,956,716 A | 9/1999 | Kenner et al. |
| 5,961,603 A | 10/1999 | Kunkel et al. |
| 5,973,683 A | 10/1999 | Cragun et al. |
| 5,973,684 A | 10/1999 | Brooks et al. |
| 5,977,964 A | 11/1999 | Williams et al. |
| 5,983,236 A | 11/1999 | Yager et al. |
| 5,987,210 A | 11/1999 | Iggulden et al. |
| 5,988,078 A | 11/1999 | Levine |
| 5,990,881 A | 11/1999 | Inoue et al. |
| 5,990,927 A | 11/1999 | Hendricks et al. |
| 5,991,799 A | 11/1999 | Yen et al. |
| 5,995,092 A | 11/1999 | Yuen et al. |
| 6,002,394 A | 12/1999 | Schein et al. |
| 6,002,401 A | 12/1999 | Baker |
| 6,002,443 A | 12/1999 | Iggulden |
| 6,002,444 A | 12/1999 | Marshall et al. |
| 6,005,561 A | 12/1999 | Hawkins et al. |
| 6,005,562 A | 12/1999 | Shiga et al. |
| 6,005,563 A | 12/1999 | White et al. |
| 6,005,565 A | 12/1999 | Legall et al. |
| 6,005,597 A | 12/1999 | Barrett et al. |
| 6,006,257 A | 12/1999 | Slezak |
| 6,006,265 A | 12/1999 | Rangan et al. |
| 6,008,802 A | 12/1999 | Ikj et al. |
| 6,008,803 A | 12/1999 | Rowe et al. |
| 6,012,086 A | 1/2000 | Lowell |
| 6,014,184 A | 1/2000 | Knee et al. |
| 6,016,141 A | 1/2000 | Knudson et al. |
| 6,018,372 A | 1/2000 | Etheredge |
| 6,018,768 A | 1/2000 | Ullman et al. |
| 6,020,883 A | 2/2000 | Herz et al. |
| 6,020,912 A | 2/2000 | De Lang |
| 6,023,267 A | 2/2000 | Chapuis et al. |
| 6,025,837 A | 2/2000 | Matthews et al. |
| 6,029,195 A | 2/2000 | Herz |
| 6,034,677 A | 3/2000 | Noguchi et al. |
| 6,034,680 A | 3/2000 | Kessenich et al. |
| 6,038,367 A | 3/2000 | Abecassis |
| 6,049,539 A | 4/2000 | Lee et al. |
| 6,058,238 A | 5/2000 | Ng |
| 6,061,719 A | 5/2000 | Bendinelli et al. |
| 6,065,047 A | 5/2000 | Carpenter et al. |
| 6,067,561 A | 5/2000 | Dillon |
| 6,072,460 A | 6/2000 | Marshall et al. |
| 6,075,526 A | 6/2000 | Rothmuller |
| 6,078,348 A | 6/2000 | Klosterman et al. |
| 6,081,750 A | 6/2000 | Hoffberg et al. |
| 6,088,722 A | 7/2000 | Herz et al. |
| 6,091,883 A | 7/2000 | Artigalas et al. |
| 6,097,383 A | 8/2000 | Gaughan et al. |
| 6,097,441 A | 8/2000 | Allport |
| 6,098,065 A | 8/2000 | Skillen et al. |
| 6,104,334 A | 8/2000 | Allport |
| 6,104,705 A | 8/2000 | Ismail et al. |
| 6,125,230 A | 9/2000 | Yaginuma |
| 6,130,726 A | 10/2000 | Darbee et al. |
| 6,133,909 A | 10/2000 | Schein et al. |
| 6,139,177 A | 10/2000 | Venkatraman et al. |
| 6,144,375 A | 11/2000 | Jain et al. |
| 6,151,017 A | 11/2000 | Suzuoka et al. |
| 6,151,643 A | 11/2000 | Cheng et al. |
| 6,157,411 A | 12/2000 | Williams et al. |
| 6,163,316 A | 12/2000 | Killian |
| 6,163,345 A | 12/2000 | Noguchi et al. |
| 6,169,542 B1 | 1/2001 | Hooks et al. |
| 6,172,674 B1 | 1/2001 | Etheredge |
| 6,172,677 B1 | 1/2001 | Stautner et al. |
| 6,177,931 B1 | 1/2001 | Alexander et al. |
| 6,181,335 B1 | 1/2001 | Hendricks et al. |
| 6,184,877 B1 | 2/2001 | Dodson et al. |
| 6,188,428 B1 | 2/2001 | Koz et al. |
| 6,208,384 B1 | 3/2001 | Schultheiss |
| 6,209,129 B1 | 3/2001 | Carr et al. |
| 6,212,553 B1 | 4/2001 | Lee et al. |
| 6,215,483 B1 | 4/2001 | Zigmond |
| 6,216,264 B1 | 4/2001 | Maze et al. |
| 6,219,837 B1 | 4/2001 | Yeo et al. |
| 6,226,444 B1 | 5/2001 | Goldschmidt Iki et al. |
| 6,233,389 B1 | 5/2001 | Barton et al. |
| 6,233,734 B1 | 5/2001 | Macrae et al. |
| 6,237,022 B1 | 5/2001 | Bruck et al. |
| 6,237,049 B1 | 5/2001 | Ludtke |
| 6,239,794 B1 | 5/2001 | Yuen et al. |
| 6,240,555 B1 | 5/2001 | Shoff et al. |
| 6,259,441 B1 | 7/2001 | Ahmad et al. |
| 6,262,722 B1 | 7/2001 | Allison et al. |
| 6,263,501 B1 | 7/2001 | Schein et al. |
| 6,263,505 B1 | 7/2001 | Walker et al. |
| 6,266,814 B1 | 7/2001 | Lemmons et al. |
| 6,268,849 B1 | 7/2001 | Boyer et al. |
| 6,268,856 B1 | 7/2001 | Bruck et al. |
| 6,275,268 B1 | 8/2001 | Ellis et al. |
| 6,282,713 B1 | 8/2001 | Kitsukawa et al. |
| 6,308,202 B1 | 10/2001 | Cohn et al. |
| 6,310,886 B1 | 10/2001 | Barton |
| 6,317,780 B1 | 11/2001 | Cohn et al. |
| 6,317,885 B1 | 11/2001 | Fries |
| 6,327,049 B1 | 12/2001 | Ohtsuka |
| 6,331,877 B1 | 12/2001 | Bennington et al. |
| 6,335,736 B1 | 1/2002 | Wagner et al. |
| 6,335,963 B1 | 1/2002 | Bosco |
| 6,341,374 B2 | 1/2002 | Schein et al. |
| 6,342,926 B1 | 1/2002 | Hanafee et al. |
| 6,349,410 B1 | 2/2002 | Lortz |
| 6,357,042 B2 | 3/2002 | Srinivasan et al. |
| 6,357,043 B1 | 3/2002 | Ellis et al. |
| 6,359,636 B1 | 3/2002 | Schindler et al. |
| 6,363,204 B1 | 3/2002 | Johnson et al. |
| 6,373,528 B1 | 4/2002 | Bennington et al. |
| 6,381,362 B1 | 4/2002 | Deshpande et al. |
| 6,381,582 B1 | 4/2002 | Walker et al. |
| 6,388,714 B1 | 5/2002 | Schein et al. |
| 6,392,664 B1 | 5/2002 | White et al. |
| 6,396,546 B1 | 5/2002 | Alten et al. |
| 6,400,407 B1 | 6/2002 | Zigmond et al. |
| 6,408,437 B1 | 6/2002 | Hendricks et al. |
| 6,411,696 B1 | 6/2002 | Iverson et al. |
| 6,430,743 B1 | 8/2002 | Matsuura |
| 6,437,836 B1 | 8/2002 | Huang et al. |
| 6,442,529 B1 | 8/2002 | Krishan et al. |
| 6,446,261 B1 | 9/2002 | Rosser |
| 6,452,609 B1 | 9/2002 | Katinsky et al. |
| 6,460,018 B1 | 10/2002 | Kasai et al. |
| 6,463,585 B1 | 10/2002 | Hendricks et al. |
| 6,477,579 B1 | 11/2002 | Kunkei et al. |
| 6,481,012 B1 | 11/2002 | Gordon et al. |
| 6,483,986 B1 | 11/2002 | Krapf |
| 6,483,987 B1 | 11/2002 | Goldschmidt Iki et al. |
| 6,486,920 B2 | 11/2002 | Arai et al. |
| 6,490,000 B1 | 12/2002 | Schaefer et al. |
| 6,490,722 B1 | 12/2002 | Barton et al. |
| 6,505,348 B1 | 1/2003 | Knowles et al. |
| 6,509,908 B1 | 1/2003 | Croy et al. |
| 6,516,467 B1 | 2/2003 | Schindler et al. |
| 6,518,986 B1 | 2/2003 | Mugura |
| 6,526,577 B1 | 2/2003 | Knudson et al. |
| 6,545,722 B1 | 4/2003 | Schultheiss et al. |
| 6,546,399 B1 | 4/2003 | Reed et al. |
| 6,546,556 B1 | 4/2003 | Kataoka et al. |
| 6,549,718 B1 | 4/2003 | Grooters et al. |
| 6,560,777 B2 | 5/2003 | Blackketter et al. |
| 6,564,378 B1 | 5/2003 | Satterfield et al. |
| 6,574,424 B1 | 6/2003 | Dimitri et al. |

(56) References Cited

U.S. PATENT DOCUMENTS

| | | |
|---|---|---|
| 6,580,870 B1 | 6/2003 | Kanazawa et al. |
| 6,581,207 B1 | 6/2003 | Sumita et al. |
| 6,584,153 B1 | 6/2003 | Gordon et al. |
| 6,594,825 B1 | 7/2003 | Goldschmidt Iki et al. |
| 6,598,228 B2 | 7/2003 | Hejna, Jr. |
| 6,600,503 B2 | 7/2003 | Stautner et al. |
| 6,604,240 B2 | 8/2003 | Ellis et al. |
| 6,606,103 B1 | 8/2003 | Hamlet et al. |
| 6,606,128 B2 | 8/2003 | Hanafee et al. |
| 6,609,253 B1 | 8/2003 | Swix et al. |
| 6,611,654 B1 | 8/2003 | Shteyn |
| 6,614,987 B1 | 9/2003 | Ismail et al. |
| 6,637,027 B1 | 10/2003 | Breslauer et al. |
| 6,637,032 B1 | 10/2003 | Feineib |
| 6,642,939 B1 | 11/2003 | Vallone et al. |
| 6,660,503 B2 | 12/2003 | Kierulff |
| 6,661,468 B2 | 12/2003 | Alten et al. |
| 6,675,385 B1 | 1/2004 | Wang |
| 6,675,386 B1 | 1/2004 | Hendricks et al. |
| 6,678,891 B1 | 1/2004 | Wilcox et al. |
| 6,698,020 B1 | 2/2004 | Zigmond et al. |
| 6,701,528 B1 | 3/2004 | Arsenault et al. |
| 6,704,491 B1 | 3/2004 | Revis |
| 6,728,713 B1 | 4/2004 | Beach et al. |
| 6,732,369 B1 | 5/2004 | Schein et al. |
| 6,738,978 B1 | 5/2004 | Hendricks et al. |
| 6,742,183 B1 | 5/2004 | Reynolds et al. |
| 6,745,391 B1 | 6/2004 | Macrae et al. |
| 6,750,919 B1 | 6/2004 | Rosser |
| 6,751,776 B1 | 6/2004 | Gong |
| 6,751,800 B1 | 6/2004 | Fukuda et al. |
| 6,754,904 B1 | 6/2004 | Cooper et al. |
| 6,754,905 B2 | 6/2004 | Gordon et al. |
| 6,756,997 B1 | 6/2004 | Ward, III et al. |
| 6,757,906 B1 | 6/2004 | Look et al. |
| 6,760,537 B2 | 7/2004 | Mankovitz |
| 6,766,524 B1 | 7/2004 | Matheny et al. |
| 6,799,326 B2 | 9/2004 | Boylan, III et al. |
| 6,802,074 B1 | 10/2004 | Mitsui et al. |
| 6,813,775 B1 | 11/2004 | Finseth et al. |
| 6,826,351 B1 | 11/2004 | Tsujisawa et al. |
| 6,828,993 B1 | 12/2004 | Hendricks et al. |
| 6,837,789 B2 | 1/2005 | Garahi et al. |
| 6,847,778 B1 | 1/2005 | Vallone et al. |
| 6,850,691 B1 | 2/2005 | Stam et al. |
| 6,865,746 B1 | 3/2005 | Herrington et al. |
| 6,868,440 B1 | 3/2005 | Gupta et al. |
| 6,892,354 B1 | 5/2005 | Servan-Schreiber et al. |
| 6,898,762 B2 | 5/2005 | Ellis et al. |
| 6,925,567 B1 | 8/2005 | Hirata |
| 6,928,652 B1 | 8/2005 | Goldman |
| 6,934,963 B1 | 8/2005 | Reynolds et al. |
| 6,934,965 B2 | 8/2005 | Gordon et al. |
| 6,950,624 B2 | 9/2005 | Kim et al. |
| 6,970,641 B1 | 11/2005 | Pierre et al. |
| 6,973,669 B2 | 12/2005 | Daniels |
| 6,983,483 B2 | 1/2006 | Maze et al. |
| 7,000,242 B1 | 2/2006 | Haber |
| 7,003,478 B1 | 2/2006 | Choi |
| 7,010,801 B1 | 3/2006 | Jerding et al. |
| 7,013,478 B1 | 3/2006 | Hendricks et al. |
| 7,017,173 B1 | 3/2006 | Armstrong et al. |
| 7,020,704 B1 | 3/2006 | Lipscomb et al. |
| 7,050,988 B2 | 5/2006 | Ateheson et al. |
| 7,058,635 B1 | 6/2006 | Shah-Nazaroff et al. |
| 7,079,176 B1 | 7/2006 | Freeman et al. |
| 7,088,952 B1 | 8/2006 | Saito et al. |
| 7,103,904 B1 | 9/2006 | Blackketter et al. |
| 7,117,440 B2 | 10/2006 | Gordon et al. |
| 7,134,136 B2 | 11/2006 | Hanai et al. |
| 7,143,428 B1 | 11/2006 | Bruck et al. |
| 7,159,232 B1 | 1/2007 | Blackketter et al. |
| 7,165,098 B1 | 1/2007 | Boyer et al. |
| 7,174,512 B2 | 2/2007 | Martin et al. |
| 7,185,353 B2 | 2/2007 | Schlack |
| 7,185,355 B1 | 2/2007 | Ellis et al. |
| 7,187,847 B2 | 3/2007 | Young et al. |
| 7,194,698 B2 | 3/2007 | Gottfurcht et al. |
| 7,194,754 B2 | 3/2007 | Tomsen et al. |
| 7,197,758 B1 | 3/2007 | Blackketter et al. |
| 7,200,852 B1 | 4/2007 | Block |
| 7,263,709 B1 | 8/2007 | Krapf |
| 7,328,450 B2 | 2/2008 | Macrae et al. |
| 7,349,976 B1 | 3/2008 | Glaser et al. |
| 7,359,619 B1 | 4/2008 | O'Connor et al. |
| 7,363,645 B1 | 4/2008 | Hendricks |
| 7,437,751 B2 | 10/2008 | Daniels |
| 7,480,929 B2 | 1/2009 | Klosterman et al. |
| 7,493,641 B2 | 2/2009 | Klosterman et al. |
| 7,503,055 B2 | 3/2009 | Reynolds et al. |
| 7,584,491 B2 | 9/2009 | Bruckner et al. |
| 7,631,329 B1 | 12/2009 | Yamada |
| 7,665,109 B2 | 2/2010 | Matthews, III et al. |
| 7,716,700 B2 | 5/2010 | Carlucci et al. |
| 7,721,307 B2 | 5/2010 | Hendricks et al. |
| 7,757,254 B2 | 7/2010 | Shoff et al. |
| 7,761,892 B2 | 7/2010 | Ellis et al. |
| 8,046,801 B2 | 10/2011 | Ellis et al. |
| 2001/0010095 A1 | 7/2001 | Ellis et al. |
| 2001/0014975 A1 | 8/2001 | Gordon et al. |
| 2001/0027562 A1 | 10/2001 | Schein et al. |
| 2001/0029610 A1 | 10/2001 | Corvin et al. |
| 2002/0010697 A1 | 1/2002 | Marshall et al. |
| 2002/0013949 A1 | 1/2002 | Hejna |
| 2002/0026496 A1 | 2/2002 | Boyer et al. |
| 2002/0032907 A1 | 3/2002 | Daniels |
| 2002/0042918 A1 | 4/2002 | Townsend et al. |
| 2002/0054062 A1 | 5/2002 | Gerba et al. |
| 2002/0056087 A1 | 5/2002 | Berczowski et al. |
| 2002/0059599 A1 | 5/2002 | Schein et al. |
| 2002/0083439 A1 | 6/2002 | Eldering |
| 2002/0083441 A1 | 6/2002 | Flickinger et al. |
| 2002/0090203 A1 | 7/2002 | Mankowitz |
| 2002/0092017 A1 | 7/2002 | Klosterman et al. |
| 2002/0104090 A1 | 8/2002 | Stettner |
| 2002/0112249 A1 | 8/2002 | Hendricks et al. |
| 2002/0120927 A1 | 8/2002 | Harada et al. |
| 2002/0124249 A1 | 9/2002 | Shintani et al. |
| 2002/0138840 A1 | 9/2002 | Schein et al. |
| 2002/0166120 A1 | 11/2002 | Boylan, III et al. |
| 2002/0174430 A1 | 11/2002 | Ellis et al. |
| 2003/0001965 A1 | 1/2003 | Cao et al. |
| 2003/0005445 A1 | 1/2003 | Schein et al. |
| 2003/0031465 A1 | 2/2003 | Blake |
| 2003/0052905 A1 | 3/2003 | Gordon et al. |
| 2003/0056219 A1 | 3/2003 | Reichardt et al. |
| 2003/0110499 A1 | 6/2003 | Knudson et al. |
| 2003/0115600 A1 | 6/2003 | Tanaka |
| 2003/0115602 A1 | 6/2003 | Knee et al. |
| 2003/0163813 A1 | 8/2003 | Klosterman et al. |
| 2003/0163832 A1 | 8/2003 | Tsuria et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0208756 A1 | 11/2003 | Macrae et al. |
| 2004/0003407 A1 | 1/2004 | Hannafee et al. |
| 2004/0078815 A1 | 4/2004 | Lemmons et al. |
| 2004/0103439 A1 | 5/2004 | Macrae et al. |
| 2004/0139465 A1 | 7/2004 | Matthews, III et al. |
| 2004/0169685 A1 | 9/2004 | Kubala |
| 2004/0210935 A1 | 10/2004 | Schein et al. |
| 2004/0221310 A1 | 11/2004 | Herrington et al. |
| 2004/0261096 A1 | 12/2004 | Matz |
| 2005/0015815 A1 | 1/2005 | Shoff et al. |
| 2005/0028208 A1 | 2/2005 | Ellis et al. |
| 2005/0120373 A1 | 6/2005 | Thomas et al. |
| 2005/0138660 A1 | 6/2005 | Boyer et al. |
| 2005/0198668 A1 | 9/2005 | Yuen et al. |
| 2005/0204388 A1 | 9/2005 | Knudson et al. |
| 2005/0229214 A1 | 10/2005 | Young et al. |
| 2005/0229215 A1 | 10/2005 | Schein et al. |
| 2005/0235320 A1 | 10/2005 | Maze et al. |
| 2005/0244138 A1 | 11/2005 | O'Connor et al. |

(56) References Cited

U.S. PATENT DOCUMENTS

| | | | |
|---|---|---|---|
| 2005/0251827 A1 | 11/2005 | Ellis et al. |
| 2005/0267819 A1 | 12/2005 | Kaplan |
| 2005/0278741 A1 | 12/2005 | Robarts et al. |
| 2005/0278768 A1 | 12/2005 | Boyer et al. |
| 2005/0283796 A1 | 12/2005 | Flickinger |
| 2005/0283800 A1 | 12/2005 | Ellis et al. |
| 2006/0031883 A1 | 2/2006 | Ellis et al. |
| 2006/0037044 A1 | 2/2006 | Daniels |
| 2007/0055986 A1* | 3/2007 | Gilley .............. G06Q 30/0241 725/34 |
| 2007/0067805 A1 | 3/2007 | Macrae et al. |
| 2007/0266400 A1 | 11/2007 | Rogers et al. |
| 2007/0271582 A1 | 11/2007 | Ellis et al. |
| 2008/0059571 A1 | 3/2008 | Khoo |
| 2008/0178221 A1 | 7/2008 | Schein et al. |
| 2008/0184308 A1 | 7/2008 | Herrington et al. |
| 2008/0184312 A1 | 7/2008 | Schein et al. |
| 2008/0184315 A1 | 7/2008 | Ellis et al. |
| 2008/0184319 A1 | 7/2008 | Mankovitz |
| 2008/0201740 A1 | 8/2008 | Boyer et al. |
| 2008/0235725 A1 | 9/2008 | Hendricks |
| 2008/0276283 A1 | 11/2008 | Boyer et al. |
| 2008/0288980 A1 | 11/2008 | Schein et al. |
| 2009/0006189 A1 | 1/2009 | Zhang et al. |
| 2009/0006368 A1 | 1/2009 | Mei et al. |
| 2009/0070817 A1 | 3/2009 | Ellis et al. |
| 2009/0077589 A1 | 3/2009 | Boyer et al. |
| 2009/0228912 A1 | 9/2009 | Reynolds et al. |
| 2010/0050202 A1 | 2/2010 | Kandekar et al. |
| 2010/0106574 A1 | 4/2010 | Cartwright |
| 2010/0111493 A1 | 5/2010 | Corvin et al. |
| 2010/0115413 A1 | 5/2010 | Schein et al. |
| 2010/0115541 A1 | 5/2010 | Schein et al. |
| 2010/0153885 A1 | 6/2010 | Yates et al. |
| 2010/0175080 A1 | 7/2010 | Yuen et al. |
| 2010/0192177 A1 | 7/2010 | Thomas et al. |
| 2010/0211969 A1 | 8/2010 | Schein et al. |
| 2010/0211975 A1 | 8/2010 | Boyer et al. |
| 2011/0173660 A1 | 7/2011 | Schein et al. |
| 2011/0197222 A1 | 8/2011 | Corvin et al. |
| 2011/0243534 A1 | 10/2011 | Thomas et al. |
| 2011/0258663 A1 | 10/2011 | Lemmons et al. |
| 2012/0023516 A1* | 1/2012 | Wolinsky ............. H04H 60/31 725/12 |
| 2012/0072956 A1 | 3/2012 | Thomas et al. |
| 2012/0272270 A1 | 10/2012 | Boyer et al. |
| 2014/0255003 A1 | 9/2014 | Abramson |

FOREIGN PATENT DOCUMENTS

| | | |
|---|---|---|
| CN | 1164162 A | 11/1997 |
| CN | 1200221 | 11/1998 |
| CN | 1226030 | 8/1999 |
| CN | 1567986 | 1/2005 |
| DE | 31 51 492 | 7/1983 |
| DE | 36 40 436 | 11/1985 |
| DE | 42 01 031 | 7/1993 |
| DE | 42 17 246 | 12/1993 |
| DE | 42 40 187 | 6/1994 |
| DE | 44 07 701 | 9/1995 |
| DE | 44 40 419 | 5/1996 |
| DE | 195 31 121 | 2/1997 |
| DE | 197 40 079 | 3/1999 |
| EP | 0 013 096 | 7/1980 |
| EP | 0 276 425 | 8/1988 |
| EP | 0 322 909 | 7/1989 |
| EP | 0 424 648 | 5/1991 |
| EP | 0 589 369 | 3/1994 |
| EP | 0 617 563 | 9/1994 |
| EP | 0 624 040 | 11/1994 |
| EP | 0 648 054 | 4/1995 |
| EP | 0 705 036 | 4/1996 |
| EP | 0 721 253 | 7/1996 |
| EP | 0 723 369 | 7/1996 |
| EP | 0 752 767 | 1/1997 |
| EP | 0 382 764 | 4/1997 |
| EP | 0 773 682 | 5/1997 |
| EP | 0 774 853 | 5/1997 |
| EP | 0 774 866 | 5/1997 |
| EP | 0 788 106 | 8/1997 |
| EP | 0 793 225 | 9/1997 |
| EP | 0 803 701 | 10/1997 |
| EP | 0 805 594 | 11/1997 |
| EP | 0 822 718 | 2/1998 |
| EP | 0 837 599 | 4/1998 |
| EP | 0 838 820 | 4/1998 |
| EP | 0 852 361 | 7/1998 |
| EP | 0 854 645 | 7/1998 |
| EP | 0 742 669 | 10/1999 |
| EP | 0 981 248 | 2/2000 |
| EP | 0 725 539 | 7/2002 |
| EP | 0 945 003 | 8/2003 |
| EP | 1 499 113 | 1/2005 |
| EP | 1 705 908 | 9/2006 |
| GB | 1 554 411 | 10/1979 |
| GB | 2 227 622 | 8/1990 |
| GB | 2 232 031 | 11/1990 |
| GB | 2 264 409 | 8/1993 |
| GB | 2 265 792 | 10/1993 |
| GB | 2 307 381 | 5/1997 |
| GB | 2 325 537 | 11/1998 |
| JP | 60-61935 | 4/1985 |
| JP | 63-092177 | 4/1988 |
| JP | 03-022770 | 1/1991 |
| JP | 03-063990 | 3/1991 |
| JP | 04-079053 | 3/1992 |
| JP | 04-227380 | 8/1992 |
| JP | 04-335395 | 11/1992 |
| JP | 05-260400 | 10/1993 |
| JP | 06-021907 | 1/1994 |
| JP | 06-022315 | 1/1994 |
| JP | 06-038165 | 2/1994 |
| JP | 06-504165 | 5/1994 |
| JP | 06-243539 | 9/1994 |
| JP | 07-20254 | 1/1995 |
| JP | 07-021619 | 1/1995 |
| JP | 07-123326 | 5/1995 |
| JP | 07-135621 | 5/1995 |
| JP | 07-147657 | 6/1995 |
| JP | 07-154349 | 6/1995 |
| JP | 07-160732 | 6/1995 |
| JP | 07-184131 | 7/1995 |
| JP | 07-193762 | 7/1995 |
| JP | 07-193763 | 7/1995 |
| JP | 08-32528 | 2/1996 |
| JP | 08-032538 | 2/1996 |
| JP | 08-056352 | 2/1996 |
| JP | 08-076778 | 3/1996 |
| JP | 08-125497 | 5/1996 |
| JP | 08-505498 | 6/1996 |
| JP | 8-506939 | 7/1996 |
| JP | 08-506941 | 7/1996 |
| JP | 08-251122 | 9/1996 |
| JP | 08-275077 | 10/1996 |
| JP | 09-102827 | 4/1997 |
| JP | 09-130346 | 5/1997 |
| JP | 09-162821 | 6/1997 |
| JP | 09 275555 | 10/1997 |
| JP | 09-510327 | 10/1997 |
| JP | 10-42235 | 2/1998 |
| JP | 10-93933 | 4/1998 |
| JP | 10-108145 | 4/1998 |
| JP | 10-162484 | 6/1998 |
| JP | 10-512420 | 11/1998 |
| JP | 11-341370 | 12/1999 |
| JP | 2000-004427 | 1/2000 |
| TW | 247388 | 10/1994 |
| WO | WO-8601359 | 2/1986 |
| WO | WO-8703766 | 6/1987 |
| WO | WO-8804507 | 6/1988 |
| WO | WO-8902682 | 3/1989 |
| WO | WO-8903085 | 4/1989 |
| WO | WO-9105436 | 4/1991 |

(56) References Cited

FOREIGN PATENT DOCUMENTS

| | | |
|---|---|---|
| WO | WO-9323957 | 11/1993 |
| WO | WO-9413107 | 6/1994 |
| WO | WO-9414282 | 6/1994 |
| WO | WO-9414284 | 6/1994 |
| WO | WO-9501056 | 1/1995 |
| WO | WO-9501057 | 1/1995 |
| WO | WO-9501058 | 1/1995 |
| WO | WO-9501059 | 1/1995 |
| WO | WO-9504431 | 2/1995 |
| WO | WO-9507003 | 3/1995 |
| WO | WO-9510910 | 4/1995 |
| WO | WO-9515657 | 6/1995 |
| WO | WO-9515658 | 6/1995 |
| WO | WO-9519092 | 7/1995 |
| WO | WO-9526608 | 10/1995 |
| WO | WO-9528055 | 10/1995 |
| WO | WO-9528799 | 10/1995 |
| WO | WO-9531069 | 11/1995 |
| WO | WO-9532583 | 11/1995 |
| WO | WO-9532585 | 11/1995 |
| WO | WO-9532587 | 11/1995 |
| WO | WO-9607270 | 3/1996 |
| WO | WO-9609721 | 3/1996 |
| WO | WO-9613013 | 5/1996 |
| WO | WO-9613932 | 5/1996 |
| WO | WO-9617467 | 6/1996 |
| WO | WO-9617473 | 6/1996 |
| WO | WO-9620555 | 7/1996 |
| WO | WO-9621990 | 7/1996 |
| WO | WO-9627989 | 9/1996 |
| WO | WO-9631980 | 10/1996 |
| WO | WO-9634486 | 10/1996 |
| WO | WO-9634491 | 10/1996 |
| WO | WO-9637983 | 11/1996 |
| WO | WO-9637996 | 11/1996 |
| WO | WO-9638962 | 12/1996 |
| WO | WO-9641471 | 12/1996 |
| WO | WO-9641478 | 12/1996 |
| WO | WO-9703521 | 1/1997 |
| WO | WO-9704595 | 2/1997 |
| WO | WO-9713368 | 4/1997 |
| WO | WO-9718675 | 5/1997 |
| WO | WO-9719555 | 5/1997 |
| WO | WO-9729458 | 8/1997 |
| WO | WO-9731480 | 8/1997 |
| WO | WO-9736422 | 10/1997 |
| WO | WO-9742763 | 11/1997 |
| WO | WO-9745786 | 12/1997 |
| WO | WO-9746943 | 12/1997 |
| WO | WO-9747106 | 12/1997 |
| WO | WO-9747124 | 12/1997 |
| WO | WO-9747143 | 12/1997 |
| WO | WO-9748230 | 12/1997 |
| WO | WO-9749237 | 12/1997 |
| WO | WO-9749241 | 12/1997 |
| WO | WO-9749242 | 12/1997 |
| WO | WO-9750251 | 12/1997 |
| WO | WO-9800975 | 1/1998 |
| WO | WO-9800976 | 1/1998 |
| WO | WO-9806219 | 2/1998 |
| WO | WO-9810589 | 3/1998 |
| WO | WO-9816062 | 4/1998 |
| WO | WO-9817063 | 4/1998 |
| WO | WO-9817064 | 4/1998 |
| WO | WO-9820675 | 5/1998 |
| WO | WO-9821664 | 5/1998 |
| WO | WO-9821877 | 5/1998 |
| WO | WO-9826569 | 6/1998 |
| WO | WO-9826584 | 6/1998 |
| WO | WO-9826596 | 6/1998 |
| WO | WO-9827723 | 6/1998 |
| WO | WO-9839893 | 9/1998 |
| WO | WO-9841013 | 9/1998 |
| WO | WO-9841020 | 9/1998 |
| WO | WO-9843183 | 10/1998 |
| WO | WO-9848566 | 10/1998 |
| WO | WO-9851076 | 11/1998 |
| WO | WO-9853611 | 11/1998 |
| WO | WO-9856173 | 12/1998 |
| WO | WO-9856176 | 12/1998 |
| WO | WO-9859493 | 12/1998 |
| WO | WO-9901984 | 1/1999 |
| WO | WO-9903267 | 1/1999 |
| WO | WO-9904561 | 1/1999 |
| WO | WO-9904570 | 1/1999 |
| WO | WO-9913471 | 3/1999 |
| WO | WO-9914947 | 3/1999 |
| WO | WO-9911065 | 4/1999 |
| WO | WO-9922523 | 5/1999 |
| WO | WO-9930491 | 6/1999 |
| WO | WO-9939280 | 8/1999 |
| WO | WO-9945700 | 9/1999 |
| WO | WO-9945701 | 9/1999 |
| WO | WO-9945702 | 9/1999 |
| WO | WO-9956466 | 11/1999 |
| WO | WO-9957904 | 11/1999 |
| WO | WO-9960783 | 11/1999 |
| WO | WO-9960789 | 11/1999 |
| WO | WO-9965237 | 12/1999 |
| WO | WO-9966719 | 12/1999 |
| WO | WO-0002380 | 1/2000 |
| WO | WO-0004706 | 1/2000 |
| WO | WO-0004708 | 1/2000 |
| WO | WO-0005889 | 2/2000 |
| WO | WO-0011869 | 3/2000 |
| WO | WO-0016548 | 3/2000 |
| WO | WO-0028734 | 5/2000 |
| WO | WO-0033560 | 6/2000 |
| WO | WO-0033565 | 6/2000 |
| WO | WO-0057645 | 9/2000 |
| WO | WO-0058834 | 10/2000 |
| WO | WO-0059214 | 10/2000 |
| WO | WO-0059223 | 10/2000 |
| WO | WO-0062299 | 10/2000 |
| WO | WO-0062533 | 10/2000 |
| WO | WO-0079798 | 12/2000 |
| WO | WO-0111874 | 2/2001 |
| WO | WO-0119086 | 3/2001 |
| WO | WO-0124052 | 4/2001 |
| WO | WO-0131915 | 5/2001 |
| WO | WO-0146843 | 6/2001 |
| WO | WO-0146869 | 6/2001 |
| WO | WO-0147238 | 6/2001 |
| WO | WO-0147249 | 6/2001 |
| WO | WO-0147257 | 6/2001 |
| WO | WO-0147273 | 6/2001 |
| WO | WO-0147279 | 6/2001 |
| WO | WO-0150743 | 7/2001 |
| WO | WO-0158158 | 8/2001 |
| WO | WO-03019932 | 3/2003 |
| WO | WO-03058537 | 7/2003 |
| WO | WO-03094134 | 11/2003 |
| WO | WO-2004063892 | 7/2004 |
| WO | WO-2004095426 | 11/2004 |

OTHER PUBLICATIONS

"Digital Video Broadcasting (DVB); DVB specification for data broadcasting",European Telecommunications Standards Institute, Draft EN 301 192 V1.2.1 (1999).

"Electronic Programme Guide (EPG); Protocol for a TV Guide using electronic data transmission" by European Telecommunication Standards Institute, May 1997, Valbonne, France, publication No. ETS 300 707.

"Honey, is there anything good on the remote tonight?", advertisement from Multichannel News, Broadband Week Section, p. 168, Nov. 30, 1998.

"How Evolve Works," from the Internet at http://www.evolveproducts.com/network.html, printed on Dec. 28, 1998.

"Reaching your subscribers is a complex and costly process—until now," from the Internet at http://www.evolveproducts.com/info.html, printed on Dec. 28, 1998.

"Sun's Next Steps in Digital Set-Tops," article in Cablevision, p. 56, Nov. 16, 1998.

(56) References Cited

OTHER PUBLICATIONS

"The Evolve EZ Guide. The Remote. Control," from the Internet at http://www.evolveproducts.com/display2.html, printed on Dec. 28, 1998.
"Using Starsight 2," published before Apr. 19, 1995.
"Verknüpfung von TV mit Internet," Forschung & Entwicklung, vol. 68, No. 18, Aug. 16, 1996, pp. 70-71, XP000631189.
"What is Jini?", from the Internet at http://java.sun.com/products/jini/whitepapers/whatsjini.pdf, printed on Jan. 25, 1999.
"Why Jini Now?", from the internet at http://java.sun.com/products/jini/whitepapers/whyjininow.pdf, printed on Jan. 25, 1999. The document bears a copyright date of 1998.
"Windows 98 Feature Combines TV, Terminal and the Internet,"New York Times, Aug. 18, 1998.
"Enhanced Content Specification" , "ATVEF", from the Internet at http://www.atvef.com/library/spec.html, printed Aug. 22, 2001, the document bears a Copyright date of 1998, 1999, 2000.
"OpenTV Launches OpenStreamer™ Technology for Broadcasters to Deliver First Ever Real-Time Digital Interactive Television", from the Internet at http://www.opentv.com/news/openstreamer_press_final.htm, printed on Jun. 28, 1999, the document bears a copyright date of 1999.
"OpenTV(R) and Interactive Channel Form Strategic Alliance to Deliver Interactive Programming to Satellite Television Subscribers", from the Internet at http://www.opentv.com/news/interactivechannelfinal.htm, printed on Jun. 8, 1999.
"Prevue Networks and OpenTV(R) Agree to Work Together on Deploying Interactive Program Guides Worldwide", from the Internet Jun. 28, 1999.
ACM Multimedia 93 Proceedings, "A Digital On-Demand Video Service Supporting Content-Based Queries," Little et al. pp. 427-436, Jul. 1993.
Addressable Converters: A New Development at CableData, Via Cable, vol. 1, No. 12 (Dec. 1981).
Armstrong, L., "Channel-Surfing's next wave: Henry Yuen's interactive TV guide takes on TCI and Viacom," BusinessWeek, Jul. 31, 1995.
Arnold, W.F., "Britain to get wired city—via telephone," Electronics, Mar. 4, 1976, at 76.
Berniker, "TV Guide going online," Broadcasting & Cable, pp. 49-52 (Jun. 13, 1994).
Blahut et al., "Interactive Television," Proceedings of the IEEE, Jul. 1995.
Boyd-Merritt, R., "Television wires two-way video," Electronic Engineering Times, Apr. 25, 1994.
Brugliera, "Digital On-Screen Display—A New Technology for the Consumer Interface," Symposium Record Cable Sessions, 18th International Television Symposium and Technical Exhibition, Montreux, Switzerland Jun. 10-15, 1993, pp. 572-586 (Jun. 11, 1993).
CableData brochure "A New Approach to Addressability" (undated).
Compton et al., "Internet CNN Newsroom: A digital video news magazine and library," Proc. of the Intl. Conf. on Multimedia Computing and Systems, Washington, May 15-18, 1995; [Proceedings of the International Conference on Multimedia Computing and Systems], Los Alamitos, IEEE Comp. Soc. Press, U.S., May 15, 1995, pp. 296-301, XP010154611.
Cramer C. et al, "Distributed Job Scheduling in a Peer-to-Peer Video Recording System" URL:http//i30www.ibds.uka.de/research/documents/p2p/2004/cramer04scheduling.pdf> [retrieved on May 5, 2004].
Davic 1.3.1 Specification Part 1, Description of Digital Audio-Visual Functionalities (Technical Report), Published by Digital Audito-Visual Council, Geneva, Switzerland (1998).
Day, R., "The Great PC/TV Debate," OEM Magazine, Jul. 1, 1996.
December, "Presenting Java," Sams.net Publishing, published Sep. 20. 1995.
Defence and Counterclaim of the First and Second Defendants, No. HC11 C 04556, between Starsight Telecast and United Video Properties (Claimants) and Virgin Media, Virgin Media Payments, and TiVo Defendants (pp. 10-11) (Mar. 14, 2012).

Dial M for Movie, Funkschau Nov. 1994, Perspektiven, Video on Demand, pp. 78-79. (English language translation attached.).
Dialing the printed page, ITT in Europe Profile, 11/Spring 1977.
DirecTV Plus2 System, Thompson Consumer Electronics, Inc. (1999).
DiRosa, S., "BIGSURF Netguide," Jul. 1995, vol. 3.1 (Sections 18, 21, and 28—renumbered as pp. 1-27).
Eckhoff, "TV Listing Star on the Computer," Central Penn Business Journal, High Beam Research (Mar. 15, 1996).
European Telecommunication Standard, "Electronic Programme Guide (EPG); Protocol for a TV Guide using electronic data transmission", pp. 1-45, sections 1-11.12.7 and annex A-P, bearing a date of May 1997.
Growing US interest in the impact of viewdata, Computing Weekly, Jul. 20, 1978.
Hartwig, Rautenberg, Bollmann, "Broadcasting and Processing of Program Guides for Digital TV", SMPTE Journal, pp. 727-732, Oct. 1997.
Hauptmann et al., "News on Demand," News-on-Demand: An Application of Informedia® Technology D-Lib Magazine, Sep. 13, 1995, XP002675162, Retrieved from the Internet: URL:http://www.dlib.org/dlib/september95/nod/page3.html [retrieved on May 2, 2012].
Hobbes Internet Timeline, Mar. 22, 2007.
Hofmann et al., "Videotext Programmiert Videorecorder," Rundfunktechnische Mitteilungen, Nov.-Dec. 1982, pp. 254-257.
Holland, G. L., "NAPLPS standard defines graphics and text communications," EDN, Jan. 10, 1985, at 179.
Iizuka et al., Building Internet TV Guide Service 1 and 2, the 53rd National Conference Proceedings, Japan, Information Processing Society of Japan, Sep. 6, 1996 p. 3-227 to 230. (English).
Index Systems Inc., "Gemstar Service Object Model," Data Format Specification, Ver. 2.0.4, pp. 58-59, Dec. 20, 2002.
Instruction Manual Using StarSight 2, StarSight Telecast, Inc., 1994.
International Search Report and Written Opinion of the International Searching Authority of counterpart application No. PCT/US2007/025094 mailed May 30, 2008.
Jaidev, "EXSLT—A Wired and Wireless Case Study," http://csharpcomputing.com/XMLTutorial/Lession15.htm, Oct. 14, 2005.
Kai et al., "Development of a Simulation System for Integrated Services Television," Report from Information Processing Society of Japan, Japan, Sep. 13, 1996, vol. 96, No. 90 p. 13-20.
Karunanithi, et al., "A Feature-Based Neural Network Movie Selection Approach," Proc. Intl. Workshop on Applications of Neural Networks to Telecommunications, Stockholm, Sweden, May 22-24, 1995, pp. 162-169.
Katkere et al., "Interactive Video on WWW: Beyond VCR-like Interfaces," Computer Networks and ISDN Systems, vol. 28, Issue 11, 1996, pp. 1559-1572.
Keith Lynch's timeline of net related terms and concepts, Mar. 22, 2007.
Khoo et al., "An Expert System Approach to Online Catalog Subject Searching," Information Processing & Management: An International Journal, vol. 30, No. 2, 1994, pp. 223-238.
Large, P., "Throw away the books—Viewdata's coming," Guardian, Jan. 10, 1978.
Large, P., "Viewdata, the invention that brings boundless advice and information to the home, also sets a test for the Post Office," Financial Guardian, Jun. 29, 1978.
Leftwich et al., StarSight Interactive Television Program Guide, Phase III, Functional/Interactional Architecture Specification Document, Orbit Interaction, Palo Alto, California (undated).
Leftwich et al., StarSight Interactive Television Program Guide, Phase IV, Functional/Interactional Architecture Specification Document, Orbit Interaction, Palo Alto, California, published before Apr. 19, 1995.
Lists> What's on Tonite TV Listings Internet Article, [Online], Jan. 28, 1995, XP002378869 Retrieved from the Internet: URL: www.scout.wisc.edu/Projects/PastProjects/NH/95-01-31/0018.html> [retrieved on Apr. 28, 2006] *the whole document*.
Lloyd, J., "Impact of technology," Financial Times, Jul. 1978.
Melton, "The Uniden Super 4800," OnSat magazine, Jun. 10-16, 1990, pp. 2-4.

(56) References Cited

OTHER PUBLICATIONS

Miller, Matthew D., "A Scenario for the Deployment of Interactive Multimedia Cable Television Systems in the United States in the 1990's", proceedings of the IEEE, vol. 82, No. 4, Apr. 1994, pp. 585-589.
Money, S.A., "Teletext and Viewdata," Butterworth & Co. Ltd., London, 1979.
Mosley, J.D., "NAPLPS chip sets, though scarce, satisfy limited US videotex demand," EDN, Mar. 21, 1985, at 57.
Neue, Digitale Strategien Bericht Von Den 5. Dermastaedter Fernsehtagen, FKT Fernseh Und Kinotechnik, vol. 49, No. 3, Mar. 1, 1995, pp. 135-139, XP000507348, Fachverlag Schiele & Schon GmbH., Berlin, DE, ISSN: 1430-9947.
Neumann, Andreas, "WDR Online Aufbau Und Perspektiven Automatisierter Online-Dienste Im WDR," Rundfunktechnische Mitteilungen, vol. 41, pp. 56-66, Jun. 1997.
Open TV fur interaktives Fernsehen, Trend & Technik, Sep. 1995 RFE, p. 100. (English language translation attached.).
Owen, K., "How dial-a-fact is coming closer to home," The Times, Sep. 30, 1977.
Owen, K., "Why the Post Office is so excited by its plans for a TV screen information service," The Times, Sep. 26, 1976.
Papers Delivered (Part 1), 61st National Conference, Information Processing Society of Japan, Oct. 3-5, 2000.
Personal Entertainment Guide—User's Guide, Version 1.0, Copyright 1991 by Lookahead Communications Inc.
Pogue, D., "State of the Art: For TiVo and Replay, New Reach," N.Y. Times, May 29, 2003.
Poole, J., "Demand for Viewdata grows," Sunday Times, Feb. 10, 1977.
Printout from Google News Archives, Mar. 22, 2007.
Prodigy Launches Interactive TV Listing, Apr. 22, 1994, Public Broadcasting Report.
Qayyum, H., "Using IVDS and VBI for Interactive Television," IEEE, Jun. 10, 1996.
Rajapakshe et al., "Video on demand," (last modified Jun. 1995) <http://www-dse.doc.ic.ac.uk/~nd/suprise_95 /Journal/vol4/shr/report.html>.
Randerson, J., "Let Sofware Catch the Game for You," New Scientist, Jul. 3, 2004.
Rath et al., "Set-Top Box Control Software: A Key Component in Digital Video," Philips Journal of Research, vol. 50, No. ½, 1996, at 185.
Rewind, replay and unwind with new high-tech TV devices, by Lawrence J. Magi d, LA Times. This document was printed from the Internet on Jun. 6, 1999 and bears a date of May 19, 1999.
Rogers, C., "Telcos vs. Cable TV: The Global View," Data Communications, No. 13, New York, pp. 75, 76, 78 and 80, Sep. 1995.
Rosch, Gary D., "New data and information system set for commercial market trial," Telephony, Mar. 20, 1978, at 96.
Ruffler et al., "InfoRadio on Demand, WebTV and digiTaz—Telecommerce Case Studies," May 23, 1996.
Ryan, M., "Interactive TV Takes a Corporate Twist," Electronic Engineering Times, Jul. 10, 1995.
Schauer, Tom: Internet Article, [Online] Sep. 28, 1995, XP002378870, Retrieved from the Internet: URL: www.vision2020.moscow.com/Archives/1995/9509/0058.htlm> [retrieved on Apr. 28, 2006] *the whole document*.
Schmuckler, Eric, "A marriage that's made in cyberspace (television networks pursue links with online information services)," May 16, 1994, Mediaweek, v4, n20, p. 22 (3).
Selected pages from the "BBC Online—Schedules" web page. This web page is located at http://www.bbc.co.uk/schedules/ (as printed from the Internet on Oct. 19, 1999 and being dated as early as May 24, 1997).
Sharpless et al., "An advanced home terminal for interactive data communication," Conf. Rec. Int. Conf. Commun. ICC '77, IEEE, Jun. 12-15, 1977, at 19.6-47.
St. John Sandringham, "Dress rehearsal for the Prestel show," New Scientist, Jun. 1, 1978, 586-588.

Statement in an Examination Report dated Aug. 2, 1999 for a counterpart foreign application filed in New Zealand in which the foreign Examiner alleges that he has used "the Internet to access television listings for BBC World television as far back as mid 1996 . . . ".
Stickland, D.C., "It's a common noun," The Economist, Jun. 5, 1978.
Stokes, A., "The viewdata age: Power to the People," Computing Weekly, Jan. 1979.
SuperGuide/Uniden 4800, "A Quick Guide to Programming the Uniden 4800—Dealer Set-Up Manual," undated, 8 pages.
SuperGuide/Uniden 4800, "A User's Guide to SuperGuide's™ Features," undated, 12 pages.
Technical White Paper, "OpenTV™ Operating Environment", (© 1998 OpenTV Inc.), pp. 1-12.
Teletext presents the alternative view, Financial Times, Oct. 24, 1977.
The clickTV television program guide website of TVData of Queensbury, New York. This website is located at www.clicktv.com (as printed from the Internet on Aug. 13, 1997).
The InfoBeat television program guide website of InfoBeat, Inc. This website is located at www.infobeat.com (as printed from the Internet on Dec. 8, 1997).
The television program guide website of Gist Communications, Inc. of New York, New York. This website is located at www.gist.com (as printed from the Internet on Aug. 14, 1997).
The television program guide website of TV Guide Entertainment Network. This website is located at www.tvguide.com (as printed from the Internet on Aug. 14-22, 1997).
Three men on a Viewdata bike, The Economist, Mar. 25, 1978.
TV Guide movie database Internet web pages printed on Aug. 12, 1999 (9 pages).
TV Guide Online Set for Fall, Entertainment Marketing Letter, Aug. 1994.
Uniden®, UST-4800 Super, Integrated Receiver/Descrambler, Preliminary Reference Manual, Nov. 12, 1991, 80 pages.
Uniden®, UST-4800, Integrated Receiver/Descrambler, Installation Guide, copyright 1990, 60 pages.
Uniden®, UST-4800, Integrated Receiver/Descrambler, Operating Guide, copyright 1990, 24 pages.
UVSG Offers System-Specific Web Site Development for OPS, press release of United Video Satellite Group, Apr. 12, 1996.
UVSG Teams With Microsoft on Internet Information Server, press release of United Video Satellite Group, Feb. 22, 1996.
VideoGuide, Videoguide User's Manual, pp. 1-27, 1995.
Viewdata and its potential impact in the USA: Final Report/Volume One, The UK Experience, Link and Butler Cox & Partners Limited, Oct. 1978.
Viewdata moves in US but GEC may lose out, Computing Weekly, Jan. 25, 1978.
Viewdata Service Terminal Specification, British Post Office, Issue 5, Aug. 1978.
Von Gerhard Eitz, "Zukunftige Informations-Und Datenangebote Beim Digitalen Fernsehen—EPG Und "Lesezeichen"," Rundfunktechnische Mitteilungen, vol. 41, pp. 76-72, Apr. 30, 1997.
Waldo, Jim, "JiniTM Architecture Overview," from the Internet at http://Java.sun.com/products/jini/whitepapers/architectureoverview.pdf/ printed on Jan. 25, 1999. The document bears a copyright date of 1998.
Web TV and Its Consumer Electronics Licensees Debut First Internet Television Network and Set-Top Box, Jul. 10, 1996 <http://www.ohlfs.com/keith/self/webtv/home/HTML/home.license.html>.
Whale, "Identification of Program Similarity in Large Populations," The Computer Journal, vol. 33, No. 2, 1990, pp. 140-146.
Whitehorn, K., "Viewdata and you," Observer, Jul. 30, 1978.
Wikipedia article on CompuServe, Mar. 22, 2007.
Wittig, H. et al., "Intelligent Media Agents in Interactive Television Systems," Proceedings of The International Conference on Multimedia Computing and Systems, Los Alamitos, CA, US, May 15, 1995,-May 18, 1995, pp. 182-189, XP000603484.
Yoshida, J., "Interactive TV a Blur," Electronic Engineering Times, Jan. 30, 1995.

* cited by examiner

SYSTEMS AND METHODS FOR UPDATING MEDIA ASSET DATA BASED ON PAUSE POINT IN THE MEDIA ASSET

BACKGROUND

Traditional systems provide advertisements when users pause or fast-forward through content. However, the advertisements that are provided are blindly selected by these systems and the reasons why users paused the content are not considered. For example, these systems do not consider whether the user paused the content because the user liked certain items in the content when providing the advertisements. Therefore, the information and advertisements provided to the user when the user pauses content is not the most effective.

SUMMARY

In view of the foregoing, systems and methods for updating media asset data based on a pause point in the media asset in accordance with various embodiments of the present invention are provided.

Systems and methods for associating data with a media asset are provided. A plurality of messages from a plurality of users is received at a remote server. Each message identifies a play position within the media asset at which the respective one of the users paused the media asset. A reference play position is selected based on the play position identified by one of the plurality of messages. A number representing how many of the messages identify a play position that corresponds to the reference play position is computed. In response to determining that the number exceeds a threshold, a frame of the media asset that corresponds to the reference play position is selected. Data associated with the media asset is updated based on the selected frame.

In some embodiments, the data that is updated based on the selected frame may include setting the selected frame as cover art for the media asset. In some implementations, a display of a plurality of media asset listings may be generated. One of the plurality of media asset listings visually identifies the media asset using the cover art. In some implementations, media asset listings may be presented in a mosaic form where images of the corresponding media assets are provided in addition to, or alternative to, providing titles of the media assets. In such instances, the listings may include the frame at which more than a threshold number of users paused the media asset.

In some embodiments, the play position that corresponds to the reference play position may be determined based on how close or far the play position is to the reference play position. In particular, a difference between the play position identified by a second one of the messages and the reference play position may be computed. The number representing the number of play positions that correspond to the reference play position may be incremented in response to determining that the difference is less than a threshold value. The threshold value may be selected based on the media asset.

In some embodiments, the play position that corresponds to the reference play position may be determined based on how many changes exist between a first frame corresponding to the play position and a second frame corresponding to the reference play position. For example, a change may identify a difference between locations of objects in the first frame and the locations of the same objects in the second frame. In particular, the number representing the number of play positions that correspond to the reference play position may be incremented in response to determining that the number of changes is less than a threshold value. The threshold value may be selected based on the media asset.

In some embodiments, objects within the selected frame corresponding to the reference play position are identified. The data that is updated includes description information for the media asset. Specifically, the description information may be updated to reflect objects in the selected frame corresponding to the reference play position. For example, one of the objects includes an actor or character within the media asset, a product shown in the selected frame, or a geographical location at which the selected frame was produced. The description information may be updated to include an indication of the actor or character, product, or geographical location at which the selected frame was produced.

In some embodiments, a user input that pauses the media asset at a given play position corresponding to the reference play position may be received. In response, a display of the data corresponding the given play position may be generated. The data in the generated display may include at least one of an indication of how many other users have previously paused the media asset at a play position corresponding to the reference play position, a demographic of the other users, how many of other users have previously purchased a product featured in the selected frame, and how many other users have indicated an interest in the selected frame. In some embodiments, a frame of the media asset corresponding to the given play position is presented on a first user equipment device and the data is generated for display on a second user equipment device. In some implementations, one of the other users who has indicated an interest in the selected frame includes a first who has transmitted a social network communication to a plurality of second users indicating a like for the selected frame.

In some embodiments, user input that pauses a media asset at a play position may be received. Objects in a frame of the media asset corresponding to the play position at which the user paused the media asset are identified. A determination is made as to which of the objects in the frame is associated with attributes that match a profile associated with the user. The object in the frame that is associated with attributes that match a profile associated with the user is automatically selected. A recommendation is generated for the user based on the selected one of the objects.

In some implementations, the media asset is displayed on a first user equipment device and a presentation of the recommendation is generated on a second user equipment device. The selected one of the objects may include an actor or character within the media asset, a product shown in the selected frame, a geographical location at which the selected frame was produced, and/or any other data generated based on users who paused the media asset at a corresponding play position.

In some implementations, a display of data corresponding to the play position is generated in response to receiving the user input requesting that the media asset be paused at the play position. The data in the generated display may include at least one of an indication of how many other users have previously paused the media asset at a play position corresponding to the reference play position, a demographic of the other users, how many of other users have previously purchased a product featured in the selected frame, and how many other users have indicated an interest in the selected frame. One of the other users who has indicated an interest in the selected frame may include a first who has transmitted a social network communication to a plurality of second users indicating a like for the selected frame or media asset.

In some embodiments, the recommendation may correspond to another media asset related to the frame of the media asset at which playback was paused. In particular, a second media asset that is associated with attributes similar to the attributes of the selected object may be identified. A display of a media asset listing corresponding to the second media asset may be generated as the recommendation. In some embodiments, the frame corresponding to the play position may be set as cover art for the media asset. A display of a plurality of media asset listings may be generated where one of the plurality of media asset listings visually identifies the media asset using the cover art.

In some embodiments, a message may be transmitted to a remote server that includes the profile associated with the user who paused the media asset and identifies the play position within the media asset at which the user paused the media asset. The remote server may collect messages from multiple users and update data corresponding to the play positions at which users paused the media asset based on the received messages.

In some embodiments, a product corresponding to the selected object in the frame that is associated with attributes that match a profile of the user may be identified. A prompt allowing the user to purchase the product may be included as the recommendation presented to the user.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
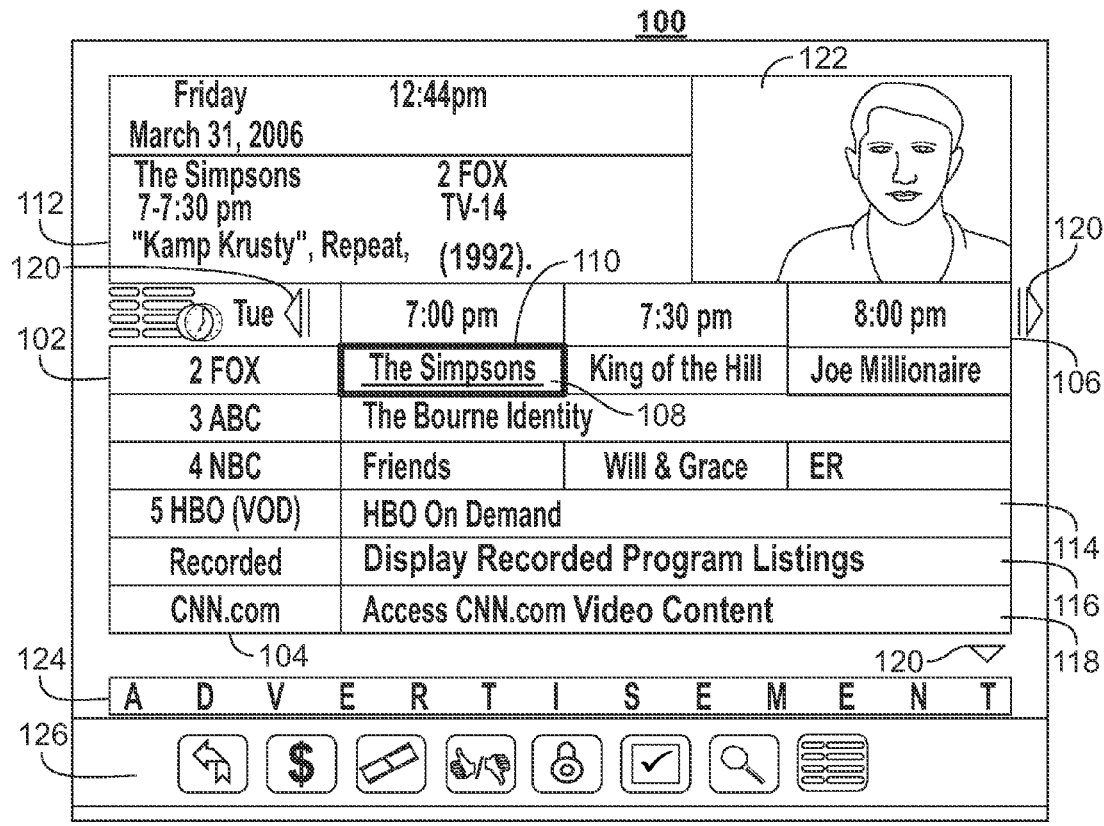
FIGS. 1 and 2 show illustrative display screens that may be used to provide media guidance application listings in accordance with an embodiment of the invention.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as program information, cover art, how many other users have previously paused the content at a given play position, a demographic of other users who have previously paused the content at the given play position, how many of other users have previously purchased a product featured in a selected frame, and how many other users have indicated an interest in a selected frame, guidance application settings, user preferences, user profile information, media listings, media-related information (e.g., broadcast times, broadcast channels, titles, descriptions, ratings information (e.g., parental control ratings, critic's ratings, etc.), messages from a crowd of users on a social network, messages from a crowd of users posted to a blog or website, genre or category information, actor information, logo data for broadcasters' or providers' logos, etc.), characters or actors featured in the content, objects featured in the content, media format (e.g., standard definition, high definition, 3D, etc.), advertisement information (e.g., text, images, media clips, etc.), on-demand information, blogs, websites, and any other type of guidance data that is helpful for a user to navigate among and locate desired content selections. In some implementations, this data may be referred to as a data feed. As referred to herein the term "crowd" should be understood to mean any number of users greater than one.

Figure 2:
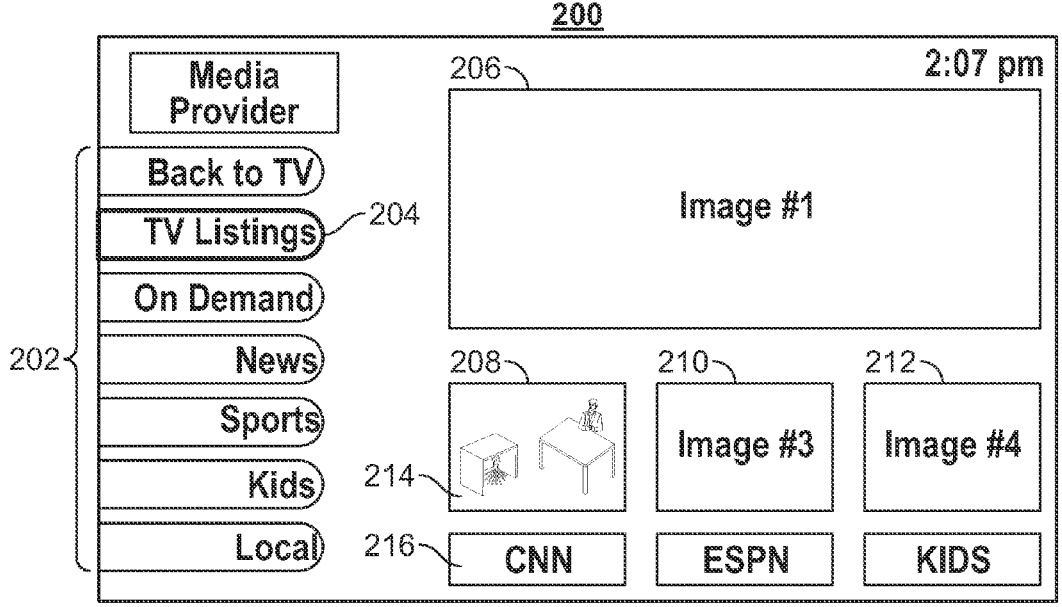
Figure 5:
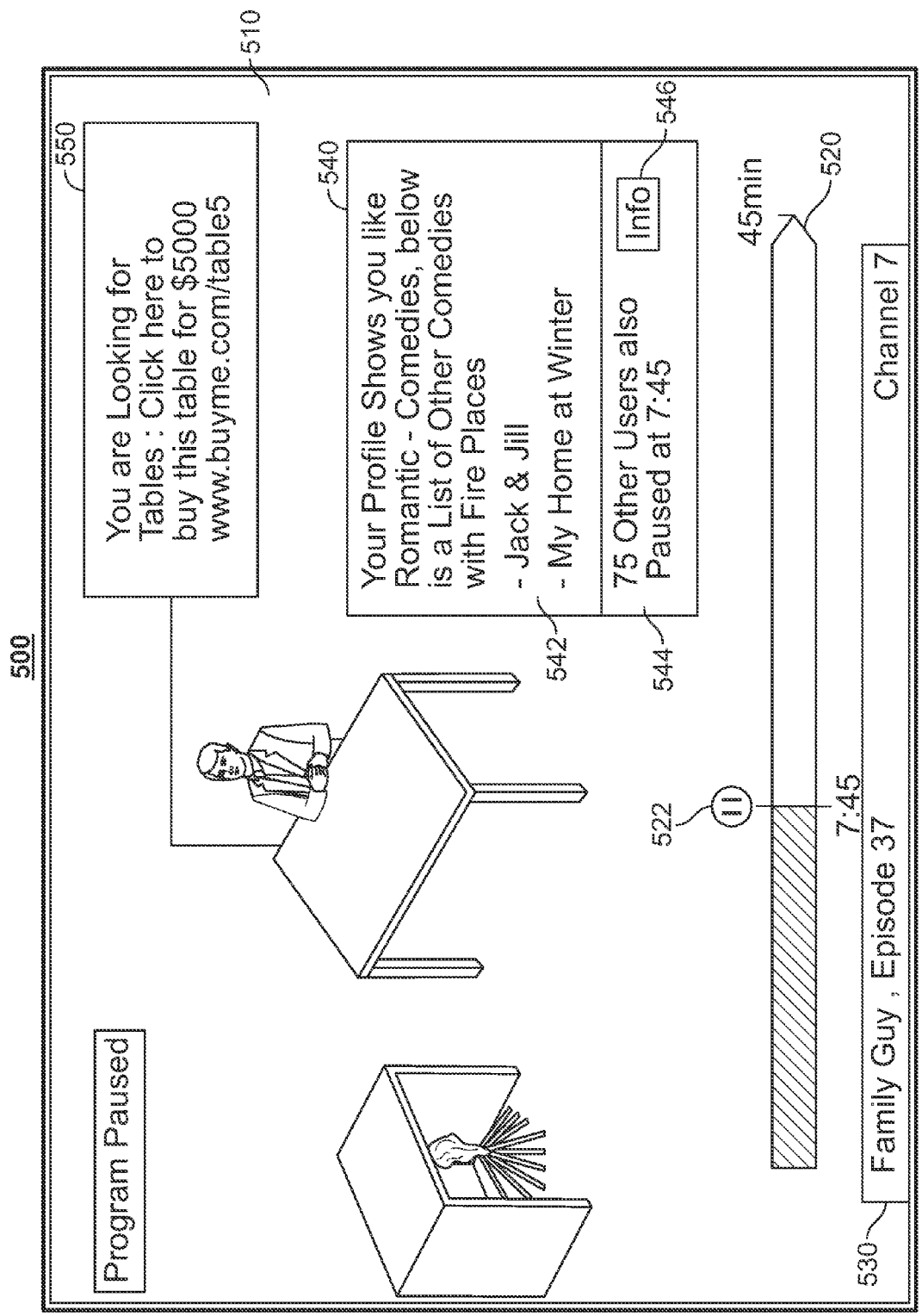
FIG. 5 shows an illustrative display screen of a recommendation that is provided based on a play position at which the media asset was paused in accordance with an embodiment of the invention.

FIGS. 1-2 show illustrative display screens that may be used to provide media guidance data. The display screens shown in FIGS. 1-2 and 5 may be implemented on any suitable user equipment device or platform. While the displays of FIGS. 1-2 and 5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data.

As referred to herein, the phrase "in response" should be understood to mean automatically, directly and immediately as a result of or automatically based on the corresponding action where intervening inputs or actions may occur.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. Instead of, or in addition to providing the title, each listing may provide a portion of the data associated with the listing. For example, the listing may include the cover art associated with the listing that depicts one or more frames of the associated content. The cover art may correspond to (e.g., may be a frame of) a play position at which the user has previously paused the program or a play position at which a plurality of other users have previously paused the program. With a user input device, a user can select program listings by moving highlight region 110. Information or any other data relating to the program listing selected by highlight region 110 may be provided in program information region 112. Region 112 may include, for example, the program title, the program description, the time the program is provided (if applicable), the channel the program is on (if applicable), the program's rating, and other desired information. The information in region 112 may be dynamically updated as different users pause the corresponding program. For example, the information in region 112 may identify objects (e.g., actors, characters, scene content, products) contained in one or more frames of play positions at which different users paused the program.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different from display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, play position at which a media asset was paused, or on other suitable targeted advertisement bases. For example, advertisement 124 may include any of the recommendations discussed below in connection with FIG. 5.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other airtimes or ways of receiving a program, recording a program, enabling series recording of a program, setting program and/or channel as a favorite, purchasing a program, identifying objects displayed in a media asset, or other features. Options available from a main menu display may include search options, VOD options (e.g., fast-access playback operations), parental control options, Internet options, cloud-based options, device synchronization options, second screen device options, options to access various types of media guidance data displays, options to subscribe to a premium service, options to edit a user's profile, options to access a browse overlay, or other options. As referred to herein, the term "object" means a character, product being advertised, advertisement, furniture, item in a scene, background item, or other article in an image or video that has distinguished boundaries that are discernible from other articles in the image or video.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. The graphical images presented in display 200 may change over time based on play positions at which one or more users pause a given media asset. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on). In some embodiments, media portion 214 may represent a frame of the corresponding media of the play position at which the user paused the media while accessing the media. In some embodiments, media portion 214 may represent a frame of the corresponding media of the play position at which a threshold number of other users have paused the media while accessing the media. In some embodiments, media portion 214 may cycle through multiple frames of the corresponding media (e.g., displaying a given frame for a predetermined period of time before displaying another one of the frames) of various play positions at which the user and/or a threshold number of other users have paused the media while accessing the media.

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
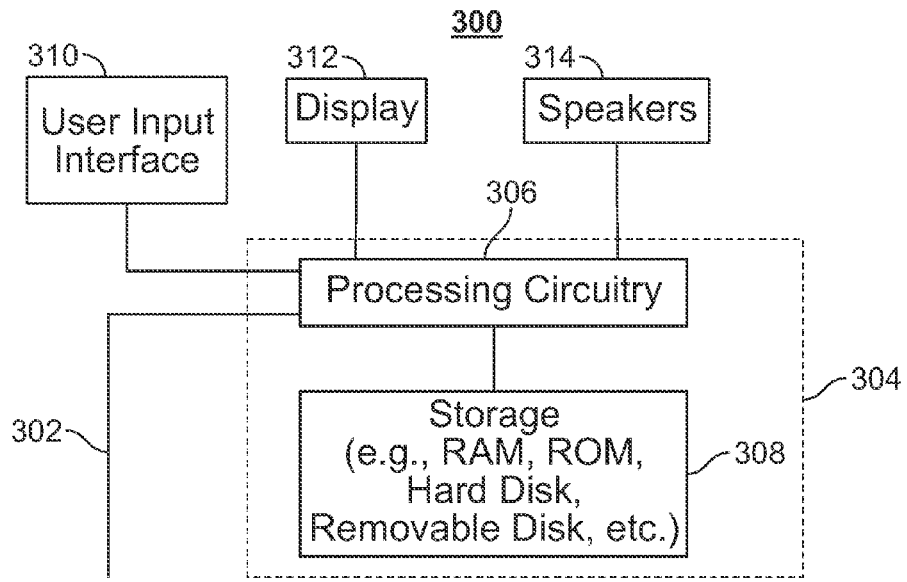
FIG. 3 shows an illustrative user equipment device in accordance with another embodiment of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

In some embodiments, a viewing history may be stored in storage 308 for a user. The viewing history may include indications of which media assets have been viewed by a given user. The viewing history may also include, for each media asset, which portion or portions have or have not been viewed by the user. In some implementations, the viewing history may include indications of which users in a group of users have seen or viewed a media asset or a particular segment of a media asset. In some implementations, the viewing history may include indications of which play position or positions the user or a group of users have paused a media asset or a particular segment of a media asset. The group of users may be users in a certain geographical location (e.g., in the same home) or users that are associated with each other on a social network.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

Control circuitry 304 may include facial recognition circuitry. Facial recognition circuitry may identify faces of characters displayed in a media asset. Facial recognition circuitry may include a database of faces that associates identified faces to names of people (e.g., actors). In some implementations, the database of faces may be stored on a remote server. For each face facial recognition circuitry identifies, facial recognition circuitry may transmit a query to the database of faces requesting the name of the person associated with the identified face. When the database of faces determines that the identified face is stored in the database, the database of faces may return to facial recognition circuitry the name associated with the identified face. When the database of faces determines that the identified face is not stored in the database or is not associated with a name, the database of faces may transmit a communication back to facial recognition circuitry indicating that the identified face is unknown.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. User input interface 310 may include keys or displayed options that enable a user to instruct control circuitry 304 to identify a displayed object corresponding to the key pressed. For example, user input interface may be a touch-screen device such that a video displayed underneath or above the touch-screen allows a user to point by pressing on the touch-screen to the object the user requests control circuitry 304 to identify.

Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
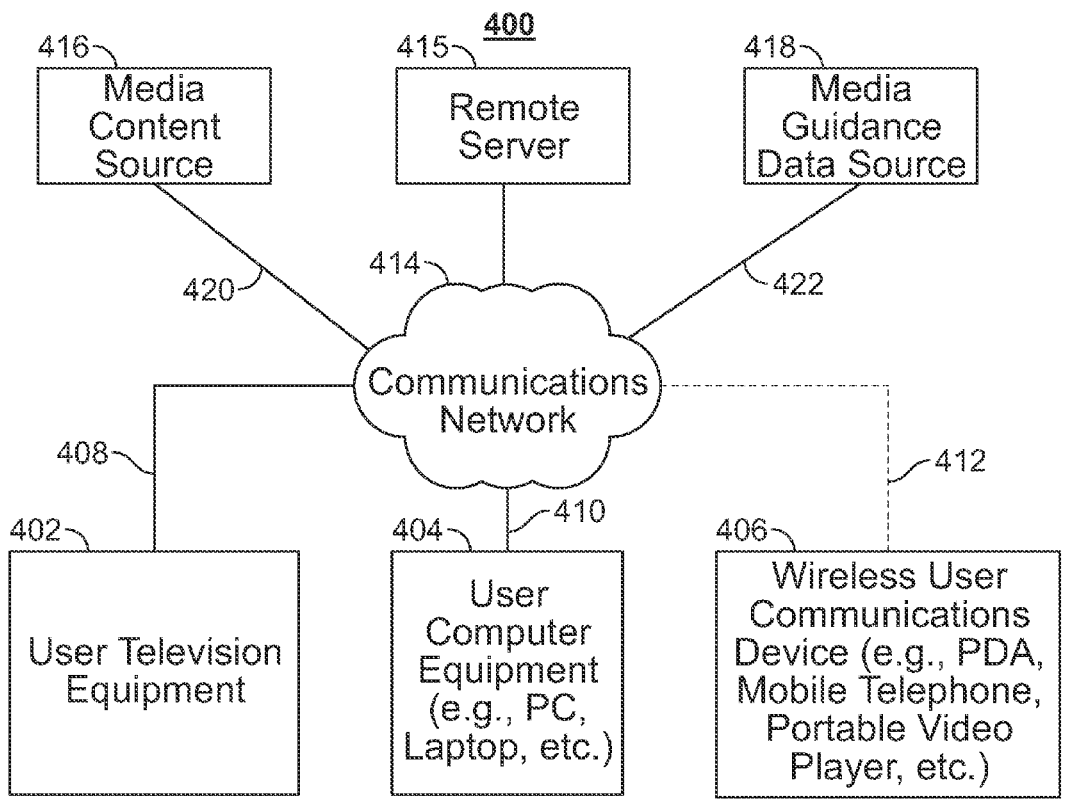
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Each user of the user equipment devices may be associated with different users in a crowd of users. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance data may be provided to the user equipment with any suitable frequency (e.g., continuously, daily, a user-specified period of time, a system-specified period of time, in response to a request from user equipment, each time one of a plurality of users pauses playback of content, etc.). Media guidance data source 418 may provide user equipment devices 402, 404, and 406 the media guidance application itself or software updates for the media guidance application. For example, in response to a first user pausing playback of a media asset, the media guidance application may identify the frame of the media asset corresponding to the position at which the media asset was paused. In response to the first user pausing the playback, the media guidance application may update the media guidance data to reflect as the cover art the frame at which the media asset was paused. After the media guidance application updates the media guidance data, in response to the first user pausing the playback, the media guidance application may transmit the updated data to a second user. The second user may then view as a program listing for the media (e.g., in a grid or mosaic display) the frame at which the first user paused the media.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of remote server 415. When executed by control circuitry of remote server 415 (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, access to messages posted by users in a crowd, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, the media guidance application may present a linear or non-linear media asset to a user and receive a user request to pause the media asset at a play position. The media guidance application may store the current playback position at the time the request to pause the playback of the media asset was received. The media guidance application may generate a message that includes an identification of the media asset and the play position at which the media asset was paused and transmit that message to remote server 415. For example, the media guidance application may present a media asset and after 20 minutes of playback, a user input requesting that playback be paused may be received (e.g., by control circuitry 304). In response, the media guidance application may store the playback position. The media guidance application may generate a message that includes a title of the media asset and the playback position (e.g., 20 minutes) for transmission to remote server 415. In some embodiments, the media guidance application may generate a recommendation to the user based on the frame (e.g., objects in the frame) of the media asset corresponding to the play position at which playback was paused by the user and based on a profile associated with the user.

In some embodiments, after remote server 415 receives a predetermined number of messages from users pausing the same media asset at a corresponding play position, remote server 415 may select a reference play position based on the play positions of the received messages and select a frame of the media asset corresponding to the reference play position. Remote server 415 may identify objects in the selected frame and update data associated with the media asset based on the selected frame. After another user requests access to the media asset, the media guidance application may present the user with the updated data (e.g., a cover art that represents the selected frame at which the users paused the media asset, a description of the objects appearing in the selected frame, and/or information about users who paused the media asset at the reference play position). In some embodiments, the updated data or some of the updated data may only be presented to the user in response to determining that the user pauses the media asset at a play position that corresponds to the reference play position.

In some embodiments, a remote server 415 coupled to communications network 414 may host a website, social network, blog and/or news site. Remote server 415 may include the same or similar circuitry or components as control circuitry 304.

FIG. 5 shows an illustrative display screen 500 of providing a recommendation based on a play position at which the media asset was paused in accordance with an embodiment of the invention. Screen 500 includes a media asset 510, an information overlay 530, a product recommendation 550, pause information 540, and a transport bar 520.

The media asset displayed in screen 500 may be a linear or non-linear media asset. For example, in some implementations, the media asset may be a live broadcast of an event. A user in the crowd may be consuming the media asset and provide input to control circuitry 304 requesting that the media asset be paused. In response, control circuitry 304 may pause play of the media asset. In some implementations, control circuitry 304 may transmit a message to remote server 415 identifying the media asset, the position associated with the pause point, and/or information about the user. In some implementations, in response to pausing play of the media asset, control circuitry 304 may present recommendation 550 and/or pause information 540. Information overlay 530 may include any information identifying or describing the media asset (e.g., a title, detailed description, content rating, etc.).

Transport bar 520 may indicate to the user a current position within the media asset relative to a start and end time of the media asset. In response to receiving a user input requesting that the media asset be paused, control circuitry 304 may present an indicator 522 identifying that the media asset has been paused. Indicator 522 may include a current play position (e.g., 7:45) associated with the pause point. Specifically, current play position corresponds to the play position at which the user instructed control circuitry 304 to pause. A region of transport bar 520 that precedes the pause position that corresponds to a portion of media asset 510 that has been viewed may be visually distinguished from other regions of transport bar 520. This allows the user to easily determine which portions of media asset 510 have already been played or viewed.

In some embodiments, control circuitry 304 may determine whether other information (e.g., a recommendation or data about other users who paused the media asset at a corresponding play position) corresponding to the paused position is available. As discussed in more detail below, a play position at which one user paused a media asset may correspond to a play position at which another user paused the media asset if the two play positions are within a threshold amount of time of each other. For example, if one user paused the media asset at a first play position of 7:45 and another paused the media asset at a second play position of 7:47, remote server 415 may determine that the first play position corresponds to the second play position because they are within two minutes of each other. A play position at which one user paused a media asset may correspond to a play position at which another user paused the media asset if the frames corresponding to the two play positions have less than a threshold amount of changes between them. For example, if one user paused the media asset at a first play position corresponding to a frame with three objects at a first set of display locations and another paused the media asset at a second play position corresponding to a frame with three objects at a second set of display locations, remote server 415 may determine that the first play position corresponds to the second play position if the second set of display locations are less than a threshold distance from the first set of display locations.

Control circuitry 304 may retrieve a data structure associated with a current playback position associated with the pause point to determine whether or not information is available for the current position. The information may be provided to control circuitry 304 from remote server 415 (FIG. 4) and/or media guidance data source 418. Some of the information may have been generated based on messages received from other users identifying objects being displayed in media asset 510. In response to determining that information associated with pause point is available, control circuitry 304 may generate for display with the current frame at which playback was paused, product recommendation 550 and/or pause information 540.

In some embodiments, in case media asset 510 is a live broadcast media asset, control circuitry 304 may begin buffering subsequently received portions of media asset 510 in response to receiving user input requesting that playback be paused. For example, portions of media asset 510 that are received after the point at which the user requested control circuitry 304 to pause may be buffered to enable the user to subsequently view those portions after resuming playback of media asset 510.

The information included in pause information 540 may have been generated based on messages remote server 415 received from a plurality of users. For example, remote server 415 may receive a plurality of messages from users who paused media asset 510 at a play position that corresponds to the current position at which the current user paused media asset 510. After a threshold number of messages were received by remote server 415, remote server 415 may update pause information 540 and cause control circuitry 304 to present the updated pause information 540 associated with media asset 510 when a user subsequently pauses media asset 510 at a corresponding play position.

In some embodiments, control circuitry 304 may identify a plurality of objects that are in the frame at which media asset 510 was paused. Control circuitry 304 may use metadata to determine what objects are in the frame and retrieve information that describes the objects in the frame. For example, control circuitry 304 may determine that there are three objects in the frame of media asset 510 (e.g., a fireplace, a table and a person). Control circuitry 304 may perform face recognition to determine who the character or actor is that is the person in the frame. Control circuitry 304 may retrieve attributes associated with each object. For example, control circuitry 304 may retrieve a name of the character or actor, an identifier of the object (e.g., a model number, serial number, or any other information that uniquely identifies a given object). Control circuitry 304 may compare the retrieved attributes with attributes stored in a profile associated with the user. Control circuitry 304 may then identify which of the objects in the frame match the user profile.

In some embodiments, pause information 540 may include information 544 about other users who paused media asset 510 at a play position corresponding to the play position paused at by the user. For example, pause information 540 may include a number representing how many other users have paused at a corresponding play position. For example, pause information 540 may include demographic information about other users who have paused media asset 510 at a play position that corresponds to the play position paused at by the user. For example, pause information 540 may include an indication of how many of other users have previously purchased a product featured in the frame corresponding to the pause play position. For example, pause information 510 may indicate how many other users have indicated an interest in the frame corresponding to the pause play position (e.g., how many other users have posted content associated with the frame to a social network). In some embodiments, control circuitry 304 may receive a user selection of information option 546. In response to receiving the user selection of option 546, control circuitry 304 may generate a display of additional information about other users who have paused the media asset at a corresponding play position.

In some embodiments, control circuitry 304 may determine based on the attributes of the objects in the frame that one of the objects corresponds to an actor or person. Control circuitry 304 may use a profile associated with the user to identify other media assets that match the user profile and that feature the same actor or person. Control circuitry 304 may list the other media assets as recommendations in region 542. Control circuitry 304 may receive a user selection of any of the media assets in region 542 and enable the user to schedule a recording, schedule a reminder, or purchase the corresponding media asset that was selected.

In some embodiments, control circuitry 304 may determine based on the attributes of the objects in the frame that one of the objects corresponds to a product or item being advertised (e.g., in a commercial). Control circuitry 304 may determine whether the object that corresponds to the product matches a profile associated with the user. In response, control circuitry 304 may present product recommendation 550. Product recommendation 550 may include further information about the product that is in the frame corresponding to the position at which media asset 510 was paused. Product recommendation 550 may include an option to order or purchase the advertised product. In response to receiving a user selection of the option to order or purchase the product, control circuitry 304 may retrieve a profile associated with the user and from the profile an account associated with the user. Control circuitry 304 may utilize the account information associated with the user to communicate with the entity associated with the advertised product to place the order for the product. In some implementations, control circuitry 304 may transmit a communication over the Internet to a website and use the information included in product recommendation 550 to identify the product and complete a financial transaction purchasing the product. For example, control circuitry 304 may retrieve one or more of the fields (not shown) (e.g., product name) displayed in product recommendation 550 and perform a search over the Internet or locally for products related to the retrieved information (e.g., other associated names or brands of the product or product bar codes or UPC codes). Control circuitry 304 may then utilize the retrieved information to complete the financial transaction for the product purchase.

In some embodiments, a playback position at which media asset 510 was paused may automatically be identified and stored by control circuitry 304 in response to receiving user input to pause media asset 510. In particular, while accessing media asset 510, control circuitry 304 may receive a user input requesting to pause media asset 510. In response, control circuitry 304 may store an indication of a playback position at the time the user request was received. For example, the current playback position may correspond to four minutes after start of the media asset playback and the user request to pause media asset 510 may be received at the four-minute mark. Accordingly, control circuitry 304 may store an indication that the request to pause media asset 510 was received at the four-minute mark (e.g., four minutes from the start of the media asset). Control circuitry 304 may automatically store this indication as a playback position of the point at which media asset 510 was paused.

Control circuitry 304 may generate a message that includes information associated with the user (e.g., name, any information in a profile associated with the user, and/or demographic information); the automatically stored play position at which media asset 510 was paused; and the identifier of the media asset. Control circuitry 304 may include other information that uniquely identifies the media asset being consumed by the user in the message (e.g., any information included in overlay 530 and/or other information not included in overlay 530). For example, control circuitry 304 may retrieve data that identifies the media asset being consumed from a local or remote media asset schedule information database. For example, control circuitry 304 may include a title or unique alphanumeric sequence as the information that uniquely identifies the media asset being consumed by the user in the message. Control circuitry 304 may transmit the generated message to remote server 415 that collects similar messages from other users in the crowd of users for media asset 510.

In some embodiments, remote server 415 may collect messages received from various users in a crowd that identify the media asset and playback positions at which the various users paused the media asset. Specifically, as each message is received from a user in the crowd, remote server 415 may process the received message to retrieve a playback position at which the respective user paused the media asset. Remote server 415 may store the retrieved information in a database. For example, the database may include a userID field, a media asset field, and/or a paused playback position field. Remote server 415 may identify all of the messages that correspond to a reference play position at which different users paused playback of the media asset. This process is discussed in more detail in connection with FIG. 6 below.

Remote server 415 may generate for each different reference position a different entry in a database (e.g., media asset data) associated with the media asset. Each entry in the database may represent a different play position in the media asset at which users paused playback at corresponding play positions. For example, one entry in the media asset database may represent play position 5:26 in the media asset, which corresponds to various play positions at which different users paused playback. Another entry in the media asset database may represent play position 8:26 in the media asset, which corresponds to various play positions at which different users paused playback. Each entry in the database may include information about objects (characters, actors, products, etc.) in the frame corresponding to the play position and/or information about the users who paused playback at the corresponding position (e.g., demographic information and/or number of users who paused playback at the corresponding position). Each entry in the database may include the image of the frame corresponding to the play position. In some implementations, the image may be used as cover art that is presented in a display of program listings featuring the media asset. In some implementations, the cover art may only be updated to represent the frame corresponding to the reference play position stored in the database for the media asset for which the most amount of users paused playback. For example, remote server 415 may process each entry (representing different play positions at which users paused playback) in the database for the media asset to identify how many users paused playback for each play position. The play position for which the most number of users paused playback may be selected and the corresponding frame may be set as the cover art for the media asset.

In some embodiments, each entry in the database may include description information for the media asset. Remote server 415 may update the description information to reflect objects in the selected frame corresponding to the reference play position. For example, one of the objects includes an actor or character within the media asset, a product shown in the selected frame, or a geographical location at which the selected frame was produced. The description information may be updated to include an indication of the actor or character, product, or geographical location at which the selected frame was produced. In some implementations, the description information may only be updated to represent the objects in the frame corresponding to the reference play position stored in the database for the media asset for which the most amount of users paused playback. When a subsequent user requests further information about the media asset (before, after or during viewing of the media asset), control circuitry 304 of the user's user equipment device 300 may query remote server 415 for updated description information. The updated description information may identify objects featured in one of the frames at which a majority of users paused playback. In some implementations, the displayed description information may include a separate field for such paused playback-based information.

In some embodiments, each entry in the database may include an indication of the number of users who purchased products featured in the frame corresponding to the paused playback position. For example, remote server 415 may retrieve a profile associated with each user who paused the media asset at the corresponding play position. Remote server 415 may compare products identified in the user profile to have been purchased by the user with the objects identified in the frame corresponding to the play position. Remote server 415 may then compute increment a number for each user profile that indicates a product has been purchased corresponding to an object featured in the frame and store that number in the entry for the playback position.

In some embodiments, each entry in the database may include an indication of how many users indicated an interest in the frame corresponding to the paused playback position or media asset. For example, remote server 415 may retrieve a profile associated with each user who paused the media asset at the corresponding play position. Remote server 415 may determine whether the profile of the user indicates that the corresponding user has transmitted a social network communication relating to the media asset or frame. For example, remote server 415 may determine whether the user has previously liked or commented on a social network about the media asset (e.g., whether the user posted a communication visible to a plurality of other users associated with the user (friends of the user) about the media asset). Remote server 415 may then compute increment a number for each user profile that indicates a user has transmitted a social network communication about the media asset and store that number in the entry for the playback position.

In some embodiments, when a subsequent user pauses playback of a media asset, remote server 415 may be queried by control circuitry 304 to identify information stored in the database corresponding to the play position at which the user paused playback. A communication to the server may identify the media asset being consumed by the user along with the play position at which the user paused playback. Remote server 415 may cross-reference the database associated with the media asset to determine whether any information is available for a play position corresponding to the play position at which the user paused playback. Remote server 415 may return to control circuitry 304 information contained in the database for the corresponding entry (e.g., information about objects in the corresponding frame and/or information about other users who also paused playback at the corresponding position). Control circuitry 304 may process the information received from remote server 415 with a profile associated with the user to select a recommendation to provide to the user. For example, control circuitry 304 may select one of the objects in the frame based on the profile associated with the user. Control circuitry 304 may then identify other media assets associated with the selected object and/or vendors from which the user may purchase the selected object.

Figure 6:
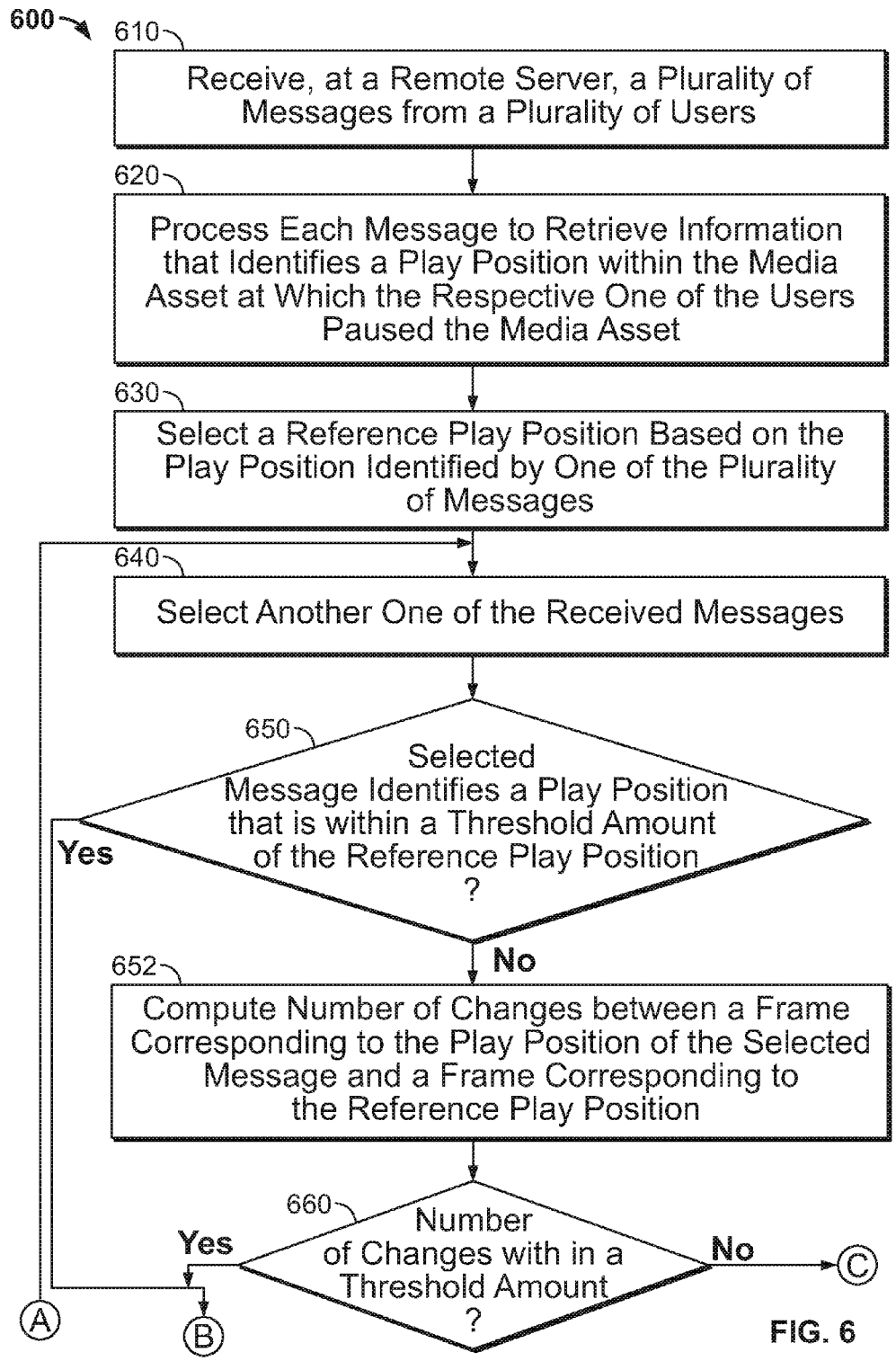
FIG. 6 is a diagram of a process for updating media asset data based on messages received from a plurality of users who paused the media asset in accordance with embodiments of the invention.
Figure 6:
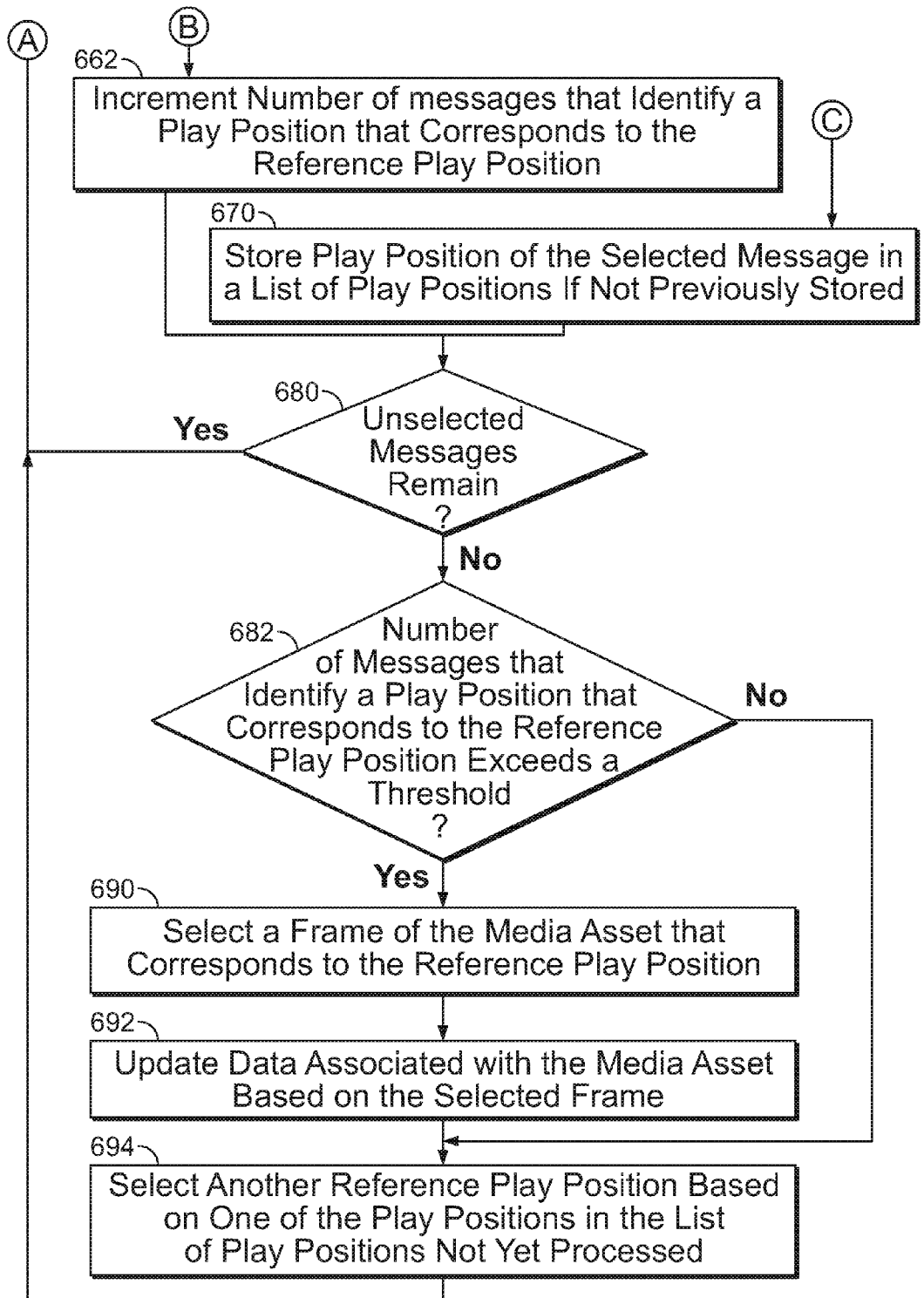

FIG. 6 is a diagram of a process 600 for updating media asset data based on messages received from a plurality of users who paused the media asset in accordance with embodiments of the invention. Specifically, in some implementations, process 600 of FIG. 6 may be a process that the media guidance application may instruct control circuitry 304 to perform. In some implementations, process 600 of FIG. 6 may be a process or instructions stored in an instruction memory of processing circuitry on remote server 415 and which remote server 415 is configured to perform.

At step 610, messages from a plurality of users are received. For example, remote server 415 may receive communications from user equipment devices 300 of each of a plurality of users. The communications may be transmitted to remote server 415 as email messages, SMS messages, TCP/IP packets, instant messages, messages posted to a social network, or any other form of packet that carries electronic information. The communications may be automatically generated by each user equipment device 300 based on a request from a user of user equipment device 300 to pause media asset 510.

At step 620, the messages are processed to extract media asset information and a play position within the media asset at which the respective one of the users paused the media asset. For example, remote server 415 may process information stored in each message and extract media asset information (e.g., a program title or unique identifier of a program) stored in the messages and playback position at which the media asset was paused stored in the messages. In some implementations, remote server 415 may extract information associated with a user who sent the message to the server (e.g., demographic information).

At step 630, a reference play position is selected based on the play position identified by one of the plurality of messages. For example, remote server 415 may select a first message from the received messages. Remote server 415 may set as the reference play position, the play position identified by the message as the play position at which the first user paused the media asset. In some embodiments, remote server 415 may generate an entry in a database (or list) for the media asset. The entry may represent a play position at which a given user paused playback of the media asset.

At step 640, another one of the received messages is selected. For example, remote server 415 may select a second message from the received messages. Remote server 415 may retrieve from the selected message the play position identified by the message as the play position at which the second user paused the media asset.

At step 650, a determination is made as to whether the selected message identifies a play position that is within a threshold amount of the reference play position. For example, remote server 415 may determine whether the play position identified by the second message corresponds to the reference play position. In some implementations, remote server 415 may select a threshold amount (e.g., five milliseconds) which may be different for each media asset. Remote server 415 may compare the play position identified by the second message with the reference play position to determine whether the second play position is within the threshold amount of the reference play position (e.g., whether the second play position is within five milliseconds of the reference position). In response to determining that the selected message is within the threshold amount of the reference play position, the process proceeds to step 662; otherwise, the process proceeds to step 652.

At step 652, a number of changes between a frame corresponding to the play position of the selected message and a frame corresponding to the reference play position is computed. For example, remote server 415 may retrieve locations of objects in the frame (i.e., video frame) corresponding to the play position of the selected message (e.g., the play position corresponding to the message from the second user) and the locations of objects in the frame (i.e., video frame) corresponding to the reference play position. Remote server 415 may compute by how much one or more of the objects changed positions between one frame and the next. This may represent the number of changes between the two frames. In some implementations, the positions may be represented on a two-dimensional plane and/or in 3D or any other number of dimensions.

At step 660, a determination is made as to whether the number of changes between the two frames is within a threshold amount. For example, remote server 415 may determine whether the play position identified by the second message corresponds to the reference play position. In some implementations, remote server 415 may select a threshold amount (e.g., five millimeters) which may be different for each media asset. Remote server 415 may compare the locations of the objects in the frame corresponding to the second message with the locations of the objects in the frame corresponding to the reference play position to determine whether the difference is within the threshold amount (e.g., whether the number of changes is within five millimeters). In response to determining that number of changes between the two frames is within a threshold amount, the process proceeds to step 662; otherwise, the process proceeds to step 670.

At step 662, a number of messages that identify a play position that corresponds to the reference play position is incremented. For example, a database entry associated with the media asset and that represents the reference play position may include several fields. One of these fields may represent the number of users who paused the media asset at a corresponding play position to the reference play position. Remote server 415 may update the entry such that the number representing the number of users is incremented based on an identification of a message from another user who paused the media asset at a play position that corresponds to the play position stored in the database entry.

At step 670, a play position of the selected message is stored in a list of play position if not previously stored. For example, remote server 415 may generate a new entry in the database for the media asset that represents a different play position (e.g., the play position identified by the second user) than the reference play position. Subsequently, remote server 415 may select the play position in the new entry as a reference play position to identify other messages that identify a play position that corresponds to the play position in the new entry.

At step 680, a determination is made as to whether unselected messages remain. For example, remote server 415 may determine whether all of the messages from each user that were received have been processed to determine whether they have play positions that correspond to the reference play position. In response to determining that additional messages remain, the process proceeds to step 640; otherwise, the process proceeds to step 682.

At step 682, a determination is made as to whether the number of messages that identify a play position that corresponds to the play position exceeds a threshold. For example, remote server 415 may select a threshold (e.g., 100 messages) and compare the number stored in the database entry for the reference play position that identifies how many users paused at a corresponding play position. In response to determining that the number of users who paused at a corresponding play position to the reference play position exceeds the threshold (e.g., exceeds 100), the process proceeds to step 690; otherwise, the process proceeds to step 694.

At step 690, a frame of the media asset that corresponds to the reference play position is selected. For example, remote server 415 may select a video frame of the media asset corresponding to the play position identified by the entry for the media asset. Remote server 415 may identify objects in the frame.

At step 692, data associated with the media asset is updated based on the selected frame. For example, remote server 415 may update the entry for the media asset associated with the reference play position to indicate all or some of the identified objects in the frame and/or information about the other users (e.g., demographic information) who paused the media asset at a play position that corresponds to the reference play position. For example, remote server 415 may set as the cover art for the media asset an image representing the frame corresponding to the reference play position. For example, remote server 415 may update description information associated with the media asset to reflect objects in the frame corresponding to the reference play position.

At step 694, another reference play position is selected based on one of the play positions in the list of play positions not yet processed. For example, remote server 415 may retrieve another play position stored in another database entry for the media asset. Remote server 415 may determine which entries in the database have not been processed based on whether or not objects in the frame corresponding to the play position and/or other users' information who have also paused at a corresponding play position have been included in the database entry.

Figure 7:
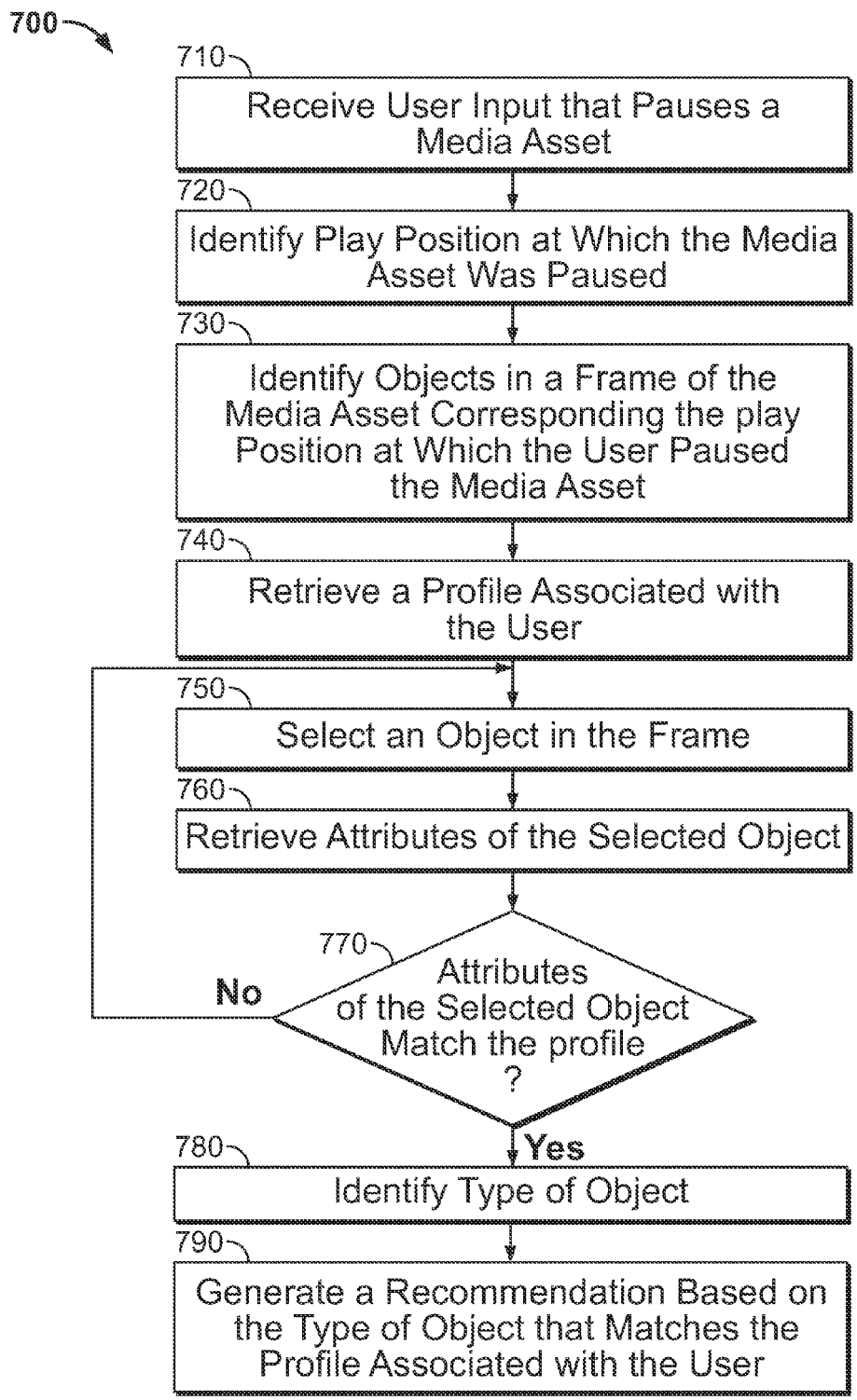
FIG. 7 is a diagram of a process for generating a recommendation based on a play position at which the media asset was paused in accordance with embodiments of the invention.

FIG. 7 is a diagram of a process 700 for generating a recommendation based on a play position at which the media asset was paused in accordance with embodiments of the invention. At step 710, a user input that pauses a media asset is received. For example, while a user is viewing media asset 510 (FIG. 5), control circuitry 304 may receive a user input that pauses playback at a play position (e.g., 7:45).

At step 720, a play position at which the media asset was paused is identified. For example, control circuitry 304 may identify the play position 7:45 at which media asset 510 was paused.

At step 730, objects in a frame of the media asset corresponding to the play position at which the user paused the media asset are identified. For example, control circuitry 304 (of user equipment device 300) may transmit a communication to remote server 415 with identification of the media asset and the play position at which playback was paused. Remote server 415 may determine whether the play position corresponds to any entry in a database associated with the media asset. In response to identifying that an entry with a play position that corresponds to the play position at which the user paused the media asset exists, remote server 415 may return to control circuitry 304 information stored in the entry in the database for the play position (e.g., information about objects in the corresponding frame and/or other users who also paused the media asset at the corresponding play position).

At step 740, a profile associated with the user is retrieved. For example, control circuitry 304 may identify who the user is that is viewing media asset 510 (e.g., based on biometric information) and retrieve a user profile associated with the user from storage 308.

At step 750, an object in the frame is selected. Control circuitry 304 may select one of the multiple objects that are identified by remote server 415 to be in the frame corresponding to the play position at which the user paused the media asset. For example, the frame may include products and actors and control circuitry 304 may first select an actor.

At step 760, attributes of the selected object are retrieved. For example, control circuitry 304 may retrieve a product identifier if the object is a product or actor name if the object is a person.

At step 770, a determination is made as to whether the attributes of the selected object match the profile. For example, control circuitry 304 may compare attributes stored in the user profile to the attributes of the selected object to determine whether a match exists. If a match exists, the process proceeds to step 780; otherwise, the process proceeds to step 750 (e.g., to select another object).

At step 780, a type of object is identified. For example, control circuitry 304 may determine whether the selected object is a person or a product.

At step 790, a recommendation is generated based on the type of object that matches the profile associated with the user. For example, control circuitry 304 may determine that the type of object is a person. In response, control circuitry 304 may identify other media assets that feature the same person. Control circuitry 304 may provide a recommendation in region 542 (FIG. 5) that includes other media assets that feature the person that matches the user profile. In some implementations, region 542 may be provided on a second screen device associated with the user while the frame of the media asset is paused on user equipment device 300. For example, control circuitry 304 may determine that the type of object is a product. In response, control circuitry 304 may provide as a recommendation 550 a link to purchase the product featured in the frame of the media asset. In some implementations, recommendation 550 may be provided on a second screen device associated with the user while the frame of the media asset is paused on user equipment device 300.

It should be understood that the above steps of the flow diagrams of FIGS. 6 and 7 may be executed or performed in any order or sequence not limited to the order and sequence shown and described in the figures. Also, some of the above steps of the flow diagrams of FIGS. 6 and 7 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method for associating data with a media asset, the method comprising:
   receiving, at a remote server, a plurality of messages from a plurality of users, wherein each message identifies a play position within the media asset at which the respective one of the users paused the media asset;
   selecting a reference play position based on the play position identified by one of the plurality of messages;
   computing a number representing how many of the messages identify a play position that corresponds to the reference play position;
   in response to determining that the number exceeds a threshold, selecting a frame of the media asset that corresponds to the reference play position; and
   updating data associated with the media asset based on the selected frame.

2. The method of claim 1, wherein updating the data comprises setting the selected frame as cover art for the media asset, further comprising generating a display of a plurality of media asset listings, wherein one of the plurality of media asset listings visually identifies the media asset using the cover art.

3. The method of claim 1, wherein computing the number comprises:
   computing a difference between the play position identified by a second one of the messages and the reference play position; and
   incrementing the number in response to determining that the difference is less than a threshold value.

4. The method of claim 1, wherein computing the number comprises:
   determining how many changes exist between a frame corresponding to the play position identified by a second one of the messages and a frame corresponding to the reference play position; and
   incrementing the number in response to determining that the number of changes is less than a threshold value.

5. The method of claim 1 further comprising identifying objects within the selected frame, wherein the data includes description information for the media asset that is updated based on the objects within the selected frame.

6. The method of claim 1 further comprising:
receiving user input that pauses the media asset at a given play position corresponding to the reference play position; and
generating a display of the data corresponding to the given play position in response to receiving the user input.

7. The method of claim 5, wherein one of the objects includes an actor or character within the media asset, a product shown in the selected frame, or a geographical location at which the selected frame was produced.

8. The method of claim 6, wherein the data in the generated display includes at least one of an indication of how many other users have previously paused the media asset at a play position corresponding to the reference play position, a demographic of the other users, how many of other users have previously purchased a product featured in the selected frame, and how many other users have indicated an interest in the selected frame.

9. The method of claim 6, wherein a frame of the media asset corresponding to the given play position is presented on a first user equipment device, and wherein the data is generated for display on a second user equipment device.

10. The method of claim 6, wherein one of the other users who has indicated an interest in the selected frame includes a first who has transmitted a social network communication to a plurality of second users indicating a like for the selected frame.

11. A system for associating data with a media asset, the system comprising:
communications circuitry at a remote server configured to receive a plurality of messages from a plurality of users, wherein each message identifies a play position within the media asset at which the respective one of the users paused the media asset;
control circuitry configured to:
select a reference play position based on the play position identified by one of the plurality of messages;
compute a number representing how many of the messages identify a play position that corresponds to the reference play position;
in response to determining that the number exceeds a threshold, select a frame of the media asset that corresponds to the reference play position; and
update data associated with the media asset based on the selected frame.

12. The system of claim 11, wherein the control circuitry configured to update the data is further configured to set the selected frame as cover art for the media asset and generate a display of a plurality of media asset listings, wherein one of the plurality of media asset listings visually identifies the media asset using the cover art.

13. The system of claim 11, wherein the control circuitry is further configured to:
compute a difference between the play position identified by a second one of the messages and the reference play position; and
increment the number in response to determining that the difference is less than a threshold value.

14. The system of claim 11, wherein the control circuitry is further configured to:
determine how many changes exist between a frame corresponding to the play position identified by a second one of the messages and a frame corresponding to the reference play position; and
increment the number in response to determining that the number of changes is less than a threshold value.

15. The system of claim 11, wherein the control circuitry is further configured to identify objects within the selected frame, wherein the data includes description information for the media asset that is updated based on the objects within the selected frame.

16. The system of claim 11, wherein the control circuitry is further configured to:
receive user input that pauses the media asset at a given play position corresponding to the reference play position; and
generate a display of the data corresponding to the given play position in response to receiving the user input.

17. The system of claim 15, wherein one of the objects includes an actor or character within the media asset, a product shown in the selected frame, or a geographical location at which the selected frame was produced.

18. The system of claim 16, wherein the data in the generated display includes at least one of an indication of how many other users have previously paused the media asset at a play position corresponding to the reference play position, a demographic of the other users, how many of other users have previously purchased a product featured in the selected frame, and how many other users have indicated an interest in the selected frame.

19. The system of claim 16, wherein a frame of the media asset corresponding to the given play position is presented on a first user equipment device, and wherein the data is generated for display on a second user equipment device.

20. The system of claim 16, wherein one of the other users who has indicated an interest in the selected frame includes a first who has transmitted a social network communication to a plurality of second users indicating a like for the selected frame.

* * * * *